(12) United States Patent
Zhong et al.

(10) Patent No.: US 10,086,954 B2
(45) Date of Patent: Oct. 2, 2018

(54) UAV FLIGHT DISPLAY

(71) Applicant: SZ DJI TECHNOLOGY CO., LTD, Shenzhen (CN)

(72) Inventors: Heli Zhong, Shenzhen (CN); Zhiyuan Zhang, Shenzhen (CN); Xiaojun Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/883,380

(22) Filed: Oct. 14, 2015

(65) Prior Publication Data

US 2016/0117853 A1  Apr. 28, 2016

Related U.S. Application Data

(63) Continuation of application No. PCT/CN2014/089605, filed on Oct. 27, 2014.

(51) Int. Cl.
*B64D 47/08* (2006.01)
*B64C 39/02* (2006.01)
(Continued)

(52) U.S. Cl.
CPC ............ *B64D 47/08* (2013.01); *B64C 39/024* (2013.01); *G01C 21/00* (2013.01); *G01C 23/00* (2013.01);
(Continued)

(58) Field of Classification Search
None
See application file for complete search history.

(56) References Cited

U.S. PATENT DOCUMENTS

| 5,947,824 A | 9/1999 | Minami et al. |
| 6,527,225 B1 | 3/2003 | Silder, Jr. et al. |

(Continued)

FOREIGN PATENT DOCUMENTS

| CN | 201004174 Y | 1/2008 |
| CN | 101241653 A | 8/2008 |

(Continued)

OTHER PUBLICATIONS

International search report and written opinion dated Jul. 3, 2015 for PCT/CN2014/089605.
(Continued)

*Primary Examiner* — Kumar Patel
*Assistant Examiner* — Richard M Russell
(74) *Attorney, Agent, or Firm* — Anova Law Group, PLLC

(57) ABSTRACT

Methods, systems, and devices are provided for displaying flight information related to a UAV. The UAV may carry a payload via a carrier that may permit the payload to move relative to the UAV. UAV related information including UAV state information and payload state information can be provided to a remote display terminal. The UAV state information can include position information as well as attitude information of the UAV. The payload state information can include attitude information of the payload relative to the UAV. The remote display terminal can be configured to simultaneously display the UAV state information and the payload state information so as to provide the user with an intuitive, comprehensive, yet efficient user interface.

30 Claims, 12 Drawing Sheets

(51) Int. Cl.
*G01C 21/00* (2006.01)
*G01C 23/00* (2006.01)

(52) U.S. Cl.
CPC .. *B64C 2201/127* (2013.01); *B64C 2201/128* (2013.01); *B64C 2201/146* (2013.01)

(56) References Cited

U.S. PATENT DOCUMENTS

| | | | |
|---|---|---|---|
| 7,970,532 B2 | 6/2011 | Tehan et al. | |
| 8,068,983 B2* | 11/2011 | Vian | G06T 15/00 |
| | | | 701/1 |
| 8,195,025 B2* | 6/2012 | Branam | H04N 5/44513 |
| | | | 386/219 |
| 8,239,047 B1 | 8/2012 | Bergeron | |
| 8,874,283 B1* | 10/2014 | Cavote | B64D 47/08 |
| | | | 701/11 |
| 8,942,964 B2 | 1/2015 | McWilliams, III | |
| 8,954,853 B2* | 2/2015 | Lacaze | G06F 3/04855 |
| | | | 701/25 |
| 2002/0087296 A1 | 7/2002 | Wynn | |
| 2003/0211806 A1 | 11/2003 | Paterson | |
| 2006/0091258 A1 | 5/2006 | Chiu et al. | |
| 2006/0102798 A1 | 5/2006 | Cox et al. | |
| 2006/0223637 A1 | 10/2006 | Rosenberg | |
| 2007/0243505 A1 | 10/2007 | Rath et al. | |
| 2008/0147366 A1 | 6/2008 | Schutz et al. | |
| 2009/0069957 A1 | 3/2009 | Nakamura | |
| 2013/0066550 A1* | 3/2013 | Takada | G01C 21/3682 |
| | | | 701/454 |
| 2014/0018979 A1 | 1/2014 | Goossen et al. | |
| 2014/0032034 A1 | 1/2014 | Raptopoulos et al. | |
| 2014/0113255 A1 | 4/2014 | Lechner et al. | |
| 2014/0221061 A1 | 8/2014 | Sitnikau | |
| 2014/0222248 A1 | 8/2014 | Levien et al. | |
| 2014/0257596 A1* | 9/2014 | Paulsen | G05D 1/0038 |
| | | | 701/2 |
| 2014/0263823 A1* | 9/2014 | Wang | B64C 39/028 |
| | | | 244/17.23 |
| 2015/0002391 A1* | 1/2015 | Chen | G06F 3/017 |
| | | | 345/156 |
| 2015/0064658 A1 | 3/2015 | Hales et al. | |
| 2015/0199086 A1* | 7/2015 | Churchill | G06F 3/04842 |
| | | | 715/739 |
| 2015/0298017 A1* | 10/2015 | Curley | A63H 29/22 |
| | | | 446/37 |
| 2015/0302756 A1 | 10/2015 | Guehring et al. | |

FOREIGN PATENT DOCUMENTS

| | | |
|---|---|---|
| CN | 101604830 A | 12/2009 |
| CN | 102193599 A | 9/2011 |
| CN | 202533754 U | 11/2012 |
| CN | 103149846 A | 6/2013 |
| CN | 103488179 A | 1/2014 |
| CN | 203551961 U | 4/2014 |
| CN | 104029825 A | 9/2014 |
| JP | 2003127994 A | 5/2003 |
| JP | 2004101616 A | 4/2004 |
| JP | 2006281830 A | 10/2006 |
| JP | 2007093045 A | 4/2007 |
| JP | 2010117656 A | 5/2010 |
| JP | 2012509812 A | 4/2012 |
| JP | 2014064640 A | 4/2014 |
| JP | 5767731 B1 | 8/2015 |
| WO | 2014108026 A1 | 7/2014 |

OTHER PUBLICATIONS

The World Intellectual Property Organization (WIPO) International Search Report for PCT/CN2015/082415 dated Oct. 8, 2015 7 Pages.
United States Patent and Trademark Office (USPTO) Office Action for U.S. Appl. No. 15/349,893 dated Feb. 17, 2017 15 Pages.
World Intellectual Patent Office (WIPO), International Search Report and Written Opinion for PCT/CN2014/088051, dated Jun. 30, 2015, 8 Pages.

* cited by examiner

UAV FLIGHT DISPLAY

CROSS REFERENCE

This application is a continuation application of International Application No. PCT/CN2014/089605, filed on Oct. 27, 2014, which is incorporated herein by reference in its entirety.

BACKGROUND OF THE INVENTION

Aerial vehicles such as unmanned aerial vehicles (UAVs) can be used for performing surveillance, reconnaissance, and exploration tasks for military and civilian applications. Such aerial vehicles may carry a payload configured to perform a specific function such as capturing images of surrounding environment.

When the UAV is airborne, especially at a high altitude or in a complex environment, it is often difficult for a remote user to visually determine the position, altitude, or other flight status information of the UAV. Traditional aircraft flight display panels permit pilots to monitor various flight information of manned aircrafts. Such flight display panels, however, are typically located in the cockpits of an aircraft and the flight information is typically displayed from the perspective of the aircraft, and would not be discernible by a remote user controlling the UAV.

SUMMARY OF THE INVENTION

In some instances, it is desirable for a remote user to obtain flight information of an unmanned aerial vehicle (UAV) on a remote display, thereby making it easier to monitor and control the UAV. Provided herein are systems and methods for providing flight information of UAVs to a remote display.

According to an aspect of the present invention, a system for providing flight information related to an unmanned aerial vehicle (UAV) is provided. The UAV is coupled to a payload via a carrier that permits the payload to move relative to the UAV. The system comprises a receiver configured to receive UAV state information comprising at least attitude information of the UAV and payload state information comprising at least attitude information of the payload relative to the UAV when the UAV is airborne; and one or more processors, collectively or individually, configured to simultaneously display the UAV state information and the carrier state information on a display that is remote to the UAV.

According to another aspect of the present invention, a method for providing flight information related to an unmanned aerial vehicle (UAV) is provided. The UAV is coupled to a payload via a carrier that permits the payload to move relative to the UAV. The method comprises receiving, by a remote terminal, UAV state information comprising at least attitude information of the UAV when the UAV is airborne; receiving, by the remote terminal, payload state information comprising at least attitude information of the payload relative to the UAV when the UAV is airborne; and simultaneously displaying the UAV state information and the payload state information on a display of the remote terminal.

In some embodiments, the payload is an image capturing device.

In some embodiments, the image capturing device comprises a camera or a camcorder.

In some embodiments, the carrier is configured to permit rotational movement of the payload around at least one axis relative to the UAV. In some embodiments, the carrier is configured to permit rotational movement of the payload around at least two axes relative to the UAV. The two axes can comprise a yaw axis and a pitch axis. In some embodiments, the carrier is configured to permit rotational movement of the payload around a third axis relative to the UAV.

In some embodiments, the carrier is configured to permit translational movement of the payload relative to the UAV.

In some embodiments, the remote terminal is operatively connected to a second remote terminal. The remote terminal can receive the UAV state information and the payload state information from the second remote terminal. In some embodiments, the second remote terminal is operable by a user to control operations of the UAV or the carrier.

In some embodiments, the remote terminal is operable by a user to control operations of the UAV or the carrier. The remote terminal can be configured to receive the UAV state information and the payload state information directly from the UAV.

In some embodiments, the remote terminal comprises a mobile terminal. The mobile terminal can comprise a smartphone or a tablet device.

In some embodiments, the remote terminal comprises one or more input mechanisms. The one or more input mechanisms can include a touchscreen or a joystick.

In some embodiments, the UAV attitude information comprises at least a yaw, pitch, or roll orientation of the UAV. The UAV state information can further comprise positional information of the UAV. The UAV state information can further comprise a height of the UAV. The UAV state information can further comprise speed information of the UAV. The speed information can include an airspeed, a groundspeed, or a vertical speed.

In some embodiments, the UAV state information further comprises a distance of the UAV relative to a reference point. The reference point can includes a location of the remote terminal. The reference point can include a home point for the UAV to return to. The reference point can include an object within a predetermined range from the UAV.

In some embodiments, the distance is based at least in part on sensing data from a proximity sensor or a visual sensor of the UAV. The predetermined range can be a maximum range of the proximity sensor.

In some embodiments, an indication is provided when the distance is outside a predetermined range. The indication can comprise a visual or audio signal. The indication can comprise a tactile feedback signal. The indication can comprise the tactile feedback comprises an application of force, a vibration, or a movement.

In some embodiments, the distance is calculated based at least in part on position data of the reference point.

In some embodiments, the UAV state information is based on sensing data from one or more sensors of the UAV. The one or more sensors of the UAV can comprise an inertial sensor, a motion sensor, a position sensor, a proximity sensor, or an image sensor.

In some embodiments, the payload attitude information comprises at least a yaw, pitch, or roll orientation of the payload relative to the UAV. The payload state information can further comprise a focal length, a zoom level, an imaging mode, an image resolution, a focus, a depth of field, an exposure, a lens speed, a film speed, or a field of view (FOV).

In some embodiments, displaying the UAV state information and the payload state information comprises displaying said information in one or more display regions. A display region for displaying the UAV state information and a display region for displaying the payload state information can at least partially overlap. The one or more display regions can comprise an icon display region and a flight parameters display region.

In some embodiments, the icon display region is used at least partially to display the UAV state information. The icon display region can include a UAV pitch/roll indicator used to indicate a pitch orientation or a roll orientation of the UAV. The UAV pitch/roll indicator can be used to indicate both a pitch orientation and a roll orientation of the UAV. The UAV pitch/roll indicator can comprise a graphical horizon line indicator. The icon display region can include payload yaw indicator used to indicate a yaw orientation of the payload.

In some embodiments, the one or more display regions are used to display a payload pitch indicator used to indicate a pitch orientation of the payload. The payload pitch indicator can comprise a scrollbar.

In some embodiments, the icon display region is used at least partially to display the UAV state information and state information of the remote terminal. The UAV state information can include a position and a heading of the UAV. The remote terminal state information can include a position and a heading of the remote terminal.

In some embodiments, the icon display region is used to illustrate a spatial relationship between the remote terminal and the UAV. The spatial relationship can include a distance between the remote terminal and the UAV.

In some embodiments, the icon display region comprises a substantially circular region.

In some embodiments, the flight parameters display region is used at least partially to display the UAV state information. The flight parameters display region can be used to display a horizontal distance, a vertical distance, a horizontal speed, and/or a vertical speed of the UAV. The flight parameters display region can be used to display a proximity indicator indicating a distance from the UAV to a reference object. The flight parameters display region can comprise a substantially rectangular region.

In some embodiments, displaying the UAV state information and the payload state information can comprise displaying one or more graphical indicators. The one or more graphical indicators can comprise an attitude indicator used to indicate an orientation of the UAV and/or the payload relative to a pitch axis, a roll axis, or a yaw axis.

In some embodiments, an area used to display the attitude indicator is used to display a position and/or bearing of the UAV. The area used to display the attitude indicator can be used to display a position and/or bearing of the remote terminal. The area used to display the attitude indicator can be used to display a field of view (FOV) of the payload. The area used to display the attitude indicator can be used to display one or more range indicators. The range indicators can include one or more concentric range rings, each with a radius corresponding to a geographic distance by a predetermined ratio.

In some embodiments, state information of the remote terminal can be received and the remote terminal state information can be simultaneously displayed with the UAV state information and the payload state information.

In some embodiments, the remote terminal information can comprise a position and/or orientation of the remote terminal.

In some embodiments, displaying the remote terminal state information with the UAV state information and the payload state information can comprise displaying a spatial relationship between the remote terminal and the UAV.

In some embodiments, payload data obtained by the payload can be received and the payload data can be simultaneously displayed with the UAV state information and the payload state information.

In some embodiments, the payload data includes image data. The image data can include still images or video.

In some embodiments, a map that shows a position of the UAV can be displayed. The map can show a position of the remote terminal. The map can show a position of a home point for the UAV to return. The map can show a field of view (FOV) of the UAV. The map can show a flight path of the UAV.

In some embodiments, information related to a power supply, a communication channel, and/or an image mode of the UAV and/or the payload can be displayed.

In some embodiments, one or more controls for controlling an operation of the UAV and/or the payload can be displayed. At least one of the one or more controls can be used to initiate an autonomous task of the UAV.

In some embodiments, the display in real time or nearly real time can be updated.

In some embodiments, one or more user-defined parameters can be received and the display can be based at least in part on the user-defined parameters.

In some embodiments, additional information can be displayed in response to a user selection of a user interface control. The user interface control can include an icon representing the UAV and the additional information includes a three-dimensional (3D) depiction of the UAV's spatial orientation relative to the remote terminal.

According to another aspect of the present invention, a method for providing flight information of an unmanned aerial vehicle (UAV) is provided. The method comprises receiving, by a remote terminal, UAV state information comprising attitude information, the UAV attitude information comprising orientation information of the UAV relative to at least two perpendicular axes; and receiving, by the remote terminal, image data captured by an image capturing device coupled to the UAV; and simultaneously displaying the UAV state information and the image data on a display of the remote terminal.

According to another aspect of the present invention, a system for providing flight information of an unmanned aerial vehicle (UAV) is provided. The system comprises a receiver configured to receive UAV state information comprising attitude information and image data captured by an image capturing device coupled to the UAV, the UAV attitude information comprising orientation information of the UAV relative to at least two perpendicular axes; and one or more processors, collectively or individually, configured to simultaneously display the UAV state information and the image data on a remote terminal.

In some embodiments, the image capturing device is coupled to the UAV via a carrier that permits the image capturing device to move rotationally around at least one axis relative to the UAV. In some embodiments, the image capturing device is coupled to the UAV via a carrier that permits the image capturing device to move rotationally around at least two axes relative to the UAV.

In some embodiments, the carrier is configured to permit rotational movement of the image capturing device around three axes relative to the UAV. The two axes can comprise a yaw axis and a pitch axis.

In some embodiments, the receiver is further configured to receive state information of the image capturing device and the one or more processors are further configured to display the state information of the image capturing device with the UAV state information and the image data.

In some embodiments, the state information of image capturing device comprises attitude information of the image capturing device. The attitude information of image capturing device comprises a pitch orientation, a roll orientation, and/or a yaw orientation of the image capturing device.

In some embodiments, the state information of the image capturing device further comprises a focal length, a zoom level, an imaging mode, an image resolution, a focus, a depth of field, an exposure, a lens speed, a film speed, or a field of view (FOV).

In some embodiments, the UAV attitude information comprising a pitch orientation, a roll orientation, or a yaw orientation of the UAV. The UAV state information can further comprise positional information of the UAV. The UAV state information can further comprise speed information of the UAV.

In some embodiments, the UAV state information further comprises a distance of the UAV relative to a reference point. The reference point can include a location of the remote terminal. The reference point can include a home point for the UAV to return to. The reference point can include an obstacle near the UAV's flight path.

In some embodiments, the one or more processors are further configured to provide an indication when the distance is outside a predetermined range. The indication can comprise a visual or audio signal. The indication can comprise a tactile feedback signal.

In some embodiments, the UAV state information further comprises information related to a power supply, a communication channel, and/or a flight control system of the UAV.

In some embodiments, the UAV state information is based on sensing data from one or more sensors of the UAV.

In some embodiments, a display region for displaying the UAV state information at least partially overlaps with a display region for displaying the image data. The display region for displaying the UAV state information can at least partially overlap with a display region for displaying state information of the image capturing device.

In some embodiments, an attitude display region is used to display attitude information of the image capturing device and/or the UAV comprising at least a pitch orientation, a yaw orientation, and/or a roll orientation. The attitude display region can be used to illustrate a spatial relationship between the UAV and the remote terminal. The attitude display region can be used to display a heading of the UAV and/or a heading of the remote terminal. The attitude display region can be used to display a field of view (FOV) of the image capturing device.

In some embodiments, the attitude display region is substantially circular.

In some embodiments, the one or more processors are further configured to display a map showing the UAV and a field of view (FOV) of the image capturing device. The map can overlap with the image data. The map cam show a flight path of the UAV.

In some embodiments, the remote terminal is configured to control an operation of the UAV, the image capturing device, and/or a carrier that couples the image capturing device to the UAV.

In some embodiments, at least one of one or more display regions is expandable and/or collapsible.

According to another aspect of the present invention, a system for providing flight information of an unmanned aerial vehicle (UAV) carrying a payload is provided, the payload coupled to the UAV via a carrier the permits the payload to move relative to the UAV. The system comprises a receiver configured to receive UAV state information comprising at least position information of the UAV and payload state information comprising at least attitude information of the payload relative to the UAV; and one or more processors, collectively or individually, configured to simultaneously display the payload state information and a map showing the state information of the UAV on a remote terminal.

According to another aspect of the present invention, a method for providing flight information related to an unmanned aerial vehicle (UAV) is provided, the UAV coupled to a payload via a carrier that permits the payload to move relative to the UAV. The method comprises receiving, by a remote terminal, UAV state information comprising at least position information of the UAV; receiving, by the remote terminal, payload state information comprising at least attitude information of the payload relative to the UAV; and simultaneously displaying the payload state information and a map showing the state information of the UAV on a display of the remote terminal.

In some embodiments, the carrier permits the payload to move rotationally around at least one axis relative to the UAV. In some embodiments, the carrier permits the payload to move rotationally around at least two axes relative to the UAV.

In some embodiments, the UAV state information comprises attitude information of the UAV. The UAV attitude information can comprise a pitch orientation, a roll orientation, or a yaw orientation of the UAV. The UAV state information can further comprise speed information of the UAV. The UAV state information can further comprise a distance of the UAV relative to a reference point.

In some embodiments, the reference point includes a location of the remote terminal. The reference point can include a home point for the UAV to return to. The reference point can include an obstacle in an environment of the UAV.

In some embodiments, an indication can be provided when the distance is outside a predetermined range. The indication can comprise a visual signal, an audio signal, or a tactile feedback signal.

In some embodiments, the UAV state information further comprises information related to a power supply, a communication channel, and/or an image mode of the UAV and/or the payload. The payload attitude information can comprise a pitch orientation, a roll orientation, and/or a yaw orientation of the payload. The payload state information can further comprise a focal length, a zoom level, an imaging mode, an image resolution, a focus, a depth of field, an exposure, a lens speed, a film speed, or a field of view (FOV).

In some embodiments, image data captured by the payload can be received and the image data can be displayed with the payload state information. The image data can be displayed with the map. The map can overlap with the image data. The map can show a spatial relationship between the UAV and one or more reference points.

In some embodiments, the one or more reference points comprise the remote terminal and/or a home point.

In some embodiments, the map shows a field of view (FOV) of the payload. The map can show a flight path of the UAV.

In some embodiments, a display region for displaying attitude information of the payload and/or the UAV is also used for displaying a spatial relationship between the UAV and the remote terminal. The spatial relationship between the UAV and the remote terminal can include a relative distance and/or a relative heading.

In some embodiments, a display region for displaying attitude information of the payload and/or the UAV is also used for displaying a field of view (FOV) of the payload.

According to another aspect of the present invention, a system for providing flight information of an unmanned aerial vehicle (UAV) carrying an image capturing device is provided. The system comprises a receiver configured to receive UAV state information comprising at least position information of the UAV and state information of the image capturing device including comprising at least a field of view (FOV); and one or more processors, collectively or individually, configured display a map that shows the UAV state information and an indicator of the FOV of the image capturing device on a remote display based on the received UAV state information and the state information of the image capturing device.

According to another aspect of the present invention, a method for providing flight information related to an unmanned aerial vehicle (UAV) carrying an image capturing device is provided. The method comprises receiving, by a remote terminal, UAV state information comprising at least position information of the UAV; receiving, by a remote terminal, state information of the image capturing device including comprising at least a field of view (FOV); and displaying a map that shows the UAV state information and an indicator of the FOV of the image capturing device on a display of the remote terminal based on the received UAV state information and the state information of the image capturing device.

In some embodiments, the image capturing device is coupled to the UAV via a carrier that permits the image capturing device to move rotationally around at least one axis relative to the UAV. In some embodiments, the image capturing device is coupled to the UAV via a carrier that permits the image capturing device to move rotationally around at least two axes relative to the UAV. In some embodiments, the carrier is configured to permit rotational movement of the image capturing device around three axes relative to the UAV.

In some embodiments, the state information of image capturing device further comprises attitude information of the image capturing device. The attitude information of image capturing device can comprise a pitch orientation, a roll orientation, and/or a yaw orientation of the image capturing device. The state information of the image capturing device can further comprise a focal length, a zoom level, an imaging mode, an image resolution, a focus, a depth of field, an exposure, a lens speed, a film speed, or a field of view (FOV).

In some embodiments, the UAV state information comprises attitude information of the UAV. The UAV attitude information can comprise a pitch orientation, a roll orientation, or a yaw orientation of the UAV. The UAV state information can further comprise speed information of the UAV. The UAV state information can further comprise a distance of the UAV relative to a reference point.

In some embodiments, the reference point includes a location of the remote terminal. The reference point can include a home point for the UAV to return to. The reference point can include an obstacle on or near the UAV's flight path.

In some embodiments, an indication can be provided when the distance is outside a predetermined range. The indication can comprise a visual signal, an audio signal, or a tactile feedback signal.

In some embodiments, the UAV state information further comprises information related to a power supply, a communication channel, and/or an image mode of the UAV and/or the image capturing device.

In some embodiments, image data captured by the image capturing device can be received and the image data can be displayed with the map.

In some embodiments, the map is displayed as a picture-in-picture of the image data.

In some embodiments, the FOV indicator shows an angle of the FOV of the image capturing device based at least in part on the payload state information. The FOV indicator can show a direction of the FOV of the image capturing device based at least in part on the payload state information. The direction of the FOV may not the same as a heading of the UAV. The FOV indicator can have a substantially cone shape.

In some embodiments, state information of the remote terminal can be received and a spatial relationship between the UAV and the remote terminal can be displayed on the map.

In some embodiments, the map shows a spatial relationship between the UAV and one or more reference points based at least in part on the UAV state information. The one or more reference points can comprise the remote terminal and/or a home point. The map can show a flight path of the UAV.

In some embodiments, the map is configured to switch between a first mode and a second mode in response to user input. A scale of the map under the first mode can be different than a scale of the map under the second mode. The scale of the map under the first mode can be automatically selected such that the map shows the UAV, the remote terminal, and a home point for the UAV on the map. The scale of the map under the second mode can be automatically selected such that the map shows primarily the UAV.

In some embodiments, the map is displayed under a first reference frame under the first mode and the map is displayed under a second reference frame under the second mode.

It shall be understood that different aspects of the invention can be appreciated individually, collectively, or in combination with each other. Various aspects of the invention described herein may be applied to any of the particular applications set forth below or for any other types of movable objects. Any description herein of unmanned aerial vehicles may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
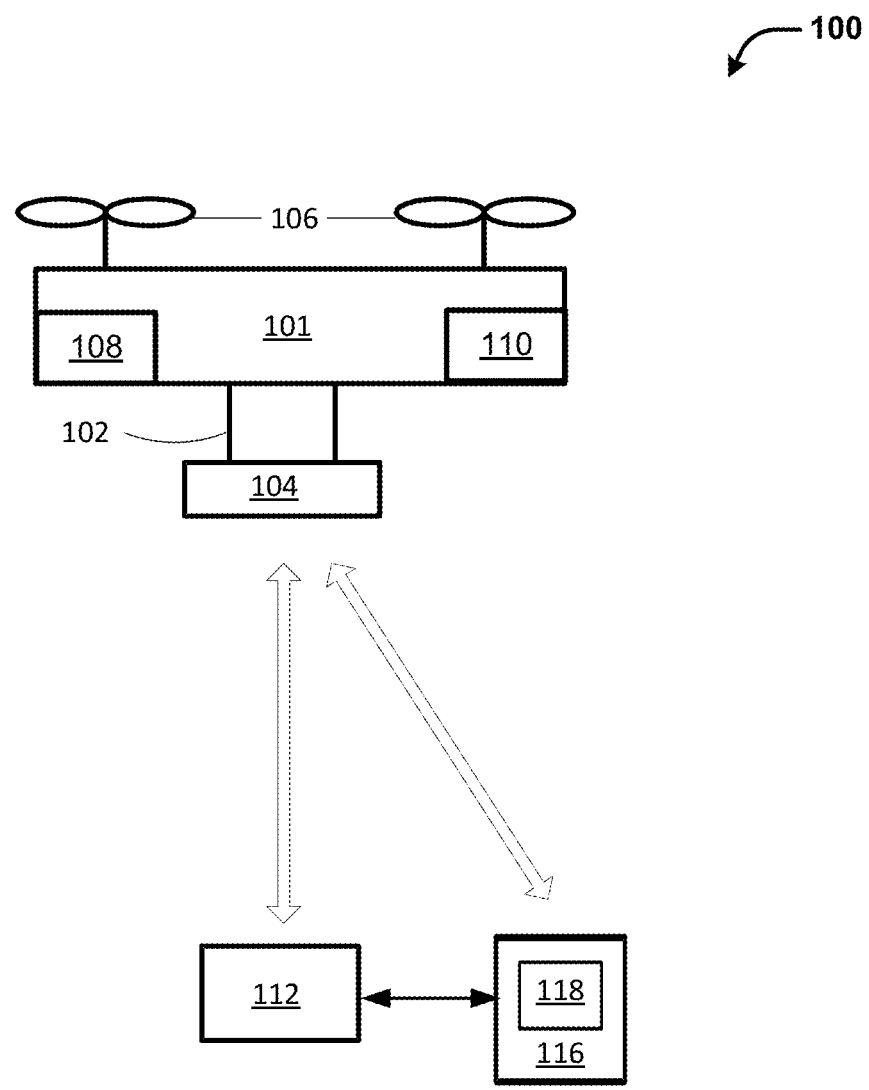
FIG. 1 illustrates an exemplary system for implementing UAV flight display, in accordance with embodiments.

Systems, methods and devices provide flight information related to an unmanned aerial vehicles (UAV), thereby allowing a remote user to effectively monitor and control the UAV. In various embodiments, flight information related to a UAV can include any information related to a UAV. The flight information can be indicative of whether the UAV is airborne or has landed. The flight information can include state information of the UAV such as its position, attitude, speed, distance, and the like. The flight information can also include state information of a payload that is coupled to the UAV, such as an image capturing device (e.g., camera or camcorder). The payload state information can include the position and/or attitude of the payload. In some embodiments, the payload may be allowed to move relative to the UAV, for example, via a carrier. As such, the payload state information (e.g., payload attitude) can differ from the UAV state information (e.g., UAV attitude). The flight information discussed herein can also include information related to a power supply, a propulsion unit, a communication system, a data storage system, one or more sensors, flight control system, and the like. For example, the flight information can be used to indicate whether there is a malfunction, error, or other issues affecting the UAV.

At least some of the flight information related to the UAV can be displayed on a remote display. The remote display can be an integral part of a remote control terminal used to remotely control the operations of the UAV. Alternatively, the remote display can be part of a terminal that is separate from but operatively connected to the remote control terminal. The remote display can be part of a mobile computing device such as a smartphone or a tablet. The mobile computing device may be connected to a remote control terminal via a wired or wireless connection.

Advantageously, the flight display as disclosed herein offers a remote user a comprehensive and intuitive view of the state information of the UAV, the payload, and/or other data that may be useful for the user without taking up excessive display space.

Information described herein can be displayed in a comprehensive yet compact fashion, thereby allowing a remote user to quickly locate relevant information. For instance, different flight information may be displayed simultaneously on the same screen so that the user does not have to look at multiple screens or displays that may span one or more display devices to locate the information. Instead, the information is provided all on a single screen. As an example, UAV state information may be displayed together with payload state information. Furthermore, flight information may be displayed simultaneously with other data received from the UAV and/or payload, such as images or other sensing data captured by the payload or other sensors on the UAV. The display areas for the flight information and/or sensing data may or may not overlap. In some embodiments, different portions of information may be displayed in different overlapping regions so as to make efficient use of the screen space.

The information can be displayed in an intuitive fashion so as to facilitate quick grasp of the information by the remote user. In contrast to the traditional aircraft flight display where information is displayed solely from the perspective of a pilot within an aircraft, the flight discussed herein can be displayed from a top down global view, from the perspective of a remote terminal, and the like, thereby providing an overall view of the relationship between different points of interest such as the UAV, the remote terminal, a reference point, and the like. In some embodiments, the UAV and/or payload state information may be displayed simultaneously with the images transmitted from the payload. Images transmitted from a payload may offer intuitive information from the perspective of an object carried by the UAV.

Further facilitating user-friendliness of the display, at least some of the information may be displayed as graphical forms instead of or in addition to numeric forms. For example, in an embodiment, the orientation of the payload/UAV can be shown using a graphical horizon indicator that dynamically shifts as the payload/UAV rotates around a certain axis (e.g., pitch, roll, yaw).

In some embodiments, a map may be displayed simultaneously with the flight data and/or images for provide further information. For example, the map may be displayed as a small of inset the image display, in a picture-in-picture arrangement. The map can show the position and/or bearing of the UAV on a satellite map, a street map, or any other suitable type of map. The map may also include information about other objects such as the remote terminal and/or a reference point (e.g., a home point for which the UAV is to land). Such a map can provide the remote user an overall or global context within which the UAV operates. In some embodiments, the map may also show a projection of the field of view (FOV) of the payload carried by the UAV so as to allow a user to quickly identify the landscape covered by the FOV.

FIG. 1 illustrates an exemplary system 100 for implementing UAV flight display, in accordance with embodiments. The system 100 includes a movable object 101 and a remote control terminal 112 and a remote display terminal 116. The movable object 101 may include propulsion mechanisms 106, a sensing system 108, and/or a communication system 110. Although the movable object 101 is depicted as an unmanned aerial vehicle (UAV), this depiction is not intended to be limiting, and any suitable type of movable object can be used, as described herein. One of skill in the art would appreciate that any of the embodiments described herein in the context of aircraft systems can be applied to any suitable movable object, such as by an unmanned vehicle or other type of movable object.

In some embodiments, the movable object 101 can include a carrier 102 and a payload 104. The carrier 102 may permit the payload 104 to move relative to the movable object 101. For instance, the carrier 102 may permit the payload 104 to move rotationally around one, two, three, or more axes relative to the movable object 101. Alternatively or additionally, the carrier 102 may permit the payload 104 to move translationally along one, two, three, or more axes. The axes for the rotational or translational movement may or may not be orthogonal to each other.

In some embodiments, the payload 104 may be rigidly coupled to or connected with the movable object 101 such that the payload 104 remains substantially stationary relative to the movable object 101. For example, the carrier 102 that connects the movable object 101 and the payload 104 may not permit the payload 104 to move relative to the movable object 101. Alternatively, the payload 104 may be coupled directly to the movable object 101 without requiring a carrier.

In some embodiments, the payload 104 can include one or more sensors for surveying or tracking objects surroundings of the UAV. Examples of such a payload may include an image capturing device or imaging device (e.g., camera or camcorder, infrared imaging device, ultraviolet imaging device, or the like), an audio capture device (e.g., a parabolic microphone), an infrared imaging device, or the like. Any suitable sensor(s) can be incorporated into the payload 104 to capture any visual, audio, electromagnetic, or any other desirable signals. The sensors can provide static sensing data (e.g., a photograph) or dynamic sensing data (e.g., a video). The sensors may capture sensing data continuously in real time or at high frequencies.

In some embodiments, the sensors on the payload can include one or more image sensors configured to convert optical signals into electronic signals. The image sensors may include semiconductor charge-coupled devices (CCD), active pixel sensors using complementary metal-oxide-semiconductor (CMOS) or N-type metal-oxide-semiconductor (NMOS, Live MOS) technologies, or any other types of sensors. The image sensor and/or imaging device may be configured to capture pictures, videos, or any other image data with any suitable parameters such as width, height, aspect ratio, megapixel count, resolution or quality, and the like. For example, the imaging device may be configured to capture high-definition or ultra-high-definition videos (e.g., 720p, 1080i, 1080p, 1440p, 2000p, 2160p, 2540p, 4000p, 4320p, and so on).

The image data captured by the image sensors can be stored in a data storage device and/or processed by one or more processors. The data storage device and/or processors can be onboard or offboard the UAV. The data storage device may be based on semiconductor, magnetic, optical, or any suitable technologies and may include flash memory, USB drives, memory cards, solid-state drives (SSDs), hard disk drives (HDDs), floppy disks, optical disks, magnetic tapes, and the like. For example, the data storage device can include removable storage devices that are detachably couplable to the image capturing device such as memory cards of any suitable formats such as PC Card, CompactFlash, SmartMedia, Memory Stick, Memory Stick Duo, Memory Stick PRO Duo, Miniature Card, Multimedia Card (MMC), Reduced Size Multimedia Card (RS-MMC), MMCmicro Card (MMCmicro), PS2 card, Secure Digital (SD) card, SxS, Universal Flash Storage (UFS), miniSD, microSD, xD-Picture Card, Intelligent Stick (iStick), Serial Flash Module (SFM), NT Card, XQD card, and the like. The data storage device can also include external hard disk drives, optical drives, tape drives, floppy drives, and other suitable storage devices that may be operatively connected to the image capturing device.

In some embodiments, communication links between the movable object and a remote terminal can be two-way communication links, such that both the movable object and the remote terminal can receive and transmit data via the communication links. Alternatively, one or more of the communication links can be a one-way communication link suitable for transmitting data in a single direction (e.g., from the movable object to the terminal, or vice-versa). For example, a data transmission link may be used to transmit sensing data collected by the movable object (e.g., position and/or orientation data collected by GPS sensors or inertial sensors, image data collected by a camera) to the terminal only, while a control data transmission link may be used to transmit control data (e.g., based on user input) from the terminal to the movable object only.

The movable object 101 can be configured to receive uplink or control data. The uplink or control data may be provided by the control terminal 112. The control data may be received by the communication system 110, flight control system, payload, or other component of the movable object 101. The control data can be used to control, directly or indirectly, aspects of the movable object 101. In some embodiments, the control data can include navigation commands for controlling navigational parameters of the movable object such as the position, speed, orientation, or attitude of the movable object 101. The control data can be used to control flight of a UAV. The control data may affect operation of one or more propulsion units 106 that may affect the flight of the UAV. In other cases, the control data can include commands for controlling individual components of the movable object 101. For instance, the control data may include information for controlling the operations of the carrier 102. For example, the control data may be used to control an actuation mechanism of the carrier 102 so as to cause angular and/or linear movement of the payload 104 relative to the movable object 101. As another example, the control data may be used to control the movement of the carrier 102 without the payload. As another example, the control data may be used to adjust one or more operational parameters for the payload 104 such as taking still or moving pictures, zooming in or out, turning on or off, switching imaging modes, change image resolution, changing focus, changing depth of field, changing exposure time, changing speed of lens, changing viewing angle or field of view, or the like. In other embodiments, the control data may be used to control a sensing system (not show), communication system (not shown), and the like, of the movable object 101.

In some embodiments, the movable object 101 can be configured to provide downlink data such as state information of the UAV and/or payload, sensing data acquired by the sensing system 108 and/or the payload 104 of the movable object 101, and the like. The downlink data may be received by the control terminal 112. The control data may be provided by the communication system 110, flight control system, payload, or other component of the movable object 101. For example, the downlink data can include the attitude, position, speed, altitude, and other state information of the UAV. The downlink data can also include attitude, FOV, depth of view, exposure speed, and other state information of the payload. As another example, real-time or nearly real-time video can be streamed from the movable object 101 and/or the payload 104 (e.g., imaging device) to the control terminal 112. The downlink data may also include sensing data acquired by the sensing system 108 that may include one or more sensors such as global positioning system (GPS) sensors, motion sensors, inertial sensors, proximity sensors, or other sensors. In various embodiments, the downlink data received by the control terminal 112 may include raw data (e.g., raw sensing data as acquired by the sensors) and/or processed data (e.g., tracking information as processed by one or more processors on the movable object).

In some embodiments, the control terminal 112 can be located at a location distant or remote from the movable object 101, carrier 102, and/or payload 104. The control terminal 112 can be disposed on or affixed to a support platform. Alternatively, the control terminal 112 can be a handheld or wearable device. For example, the control terminal 112 can include a smartphone, tablet, laptop, computer, glasses, gloves, helmet, microphone, or suitable combinations thereof.

The control terminal 112 can have one or more input mechanisms that may be manipulated by a user so as to control at least one aspect or component of the UAV. For example, a user input mechanism can include a button, a joystick, a roller ball, a touch screen, a switch, a dial, a knob, or the like. The user input mechanisms can be configured such that a user can control movement of the UAV about a roll, yaw, and/or pitch axis. The user input mechanisms can be manipulated by a user to cause translation of a UAV in a direction along a plane in three-dimensional space. The physical user interface can be further configured to provide a user control over the flight of the UAV. Controlling flight of the UAV can include controlling speed, power, throttle, and/or elevation of the UAV. In an example, the control terminal 112 can include two or more joysticks. Each of the joysticks can provide one, two, three, four, or more degrees of freedom. For example, a joystick may be moved vertically and horizontally. Each movement may correspond to a particular control command to the UAV. For instance, two joysticks may each be moved up, down, left, or right. The eight of joystick movements can correspond respectively to the six degrees of freedom of the UAV (i.e., rotation around yaw, pitch, and roll axis) plus the two throttle levels of the UAV (e.g., increasing and decreasing throttle). Increasing the throttle of the UAV may cause the UAV to gain elevation whereas decreasing the throttle of the UAV may cause the UAV to descend.

In some cases, the user input mechanisms can be used to control non-flight actions of the UAV. A non-flight action can be movement of a sensor or payload on-board the UAV. The non-flight action may include actuation of a carrier of a UAV that may be configured to carry a payload. Another example of a non-flight action can be collection and/or reporting of data collected by a sensor on-board the UAV. Additionally, the input mechanisms can be used to initiate, terminate, or otherwise control an autonomous or predetermined routine or action by the UAV or a component thereof. An autonomous or predetermined routine typically comprise a series of steps or events that occur without human intervention. Examples of such autonomous routines or actions can include automatic return, hovering, GPS flying, autonomous takeoff and/or landing, autonomous target tracking, automatic image capturing, and the like.

In some embodiments, the control terminal 112 may be equipped with one or more sensors used to measure a state of the terminal such as position, attitude or spatial orientation, or the like. Examples of such sensor can include a GPS sensor, an inertial sensor, an accelerometer, a gyroscope, a magnetometer, and the like. In some embodiments, the sensors can be used to detect an intended user input. The detected user input can then be used, with or without other user inputs, to control the UAV. For example, a tilt of the control terminal around a certain axis may be detected by an inertial sensor and used to effect a movement of the UAV or the payload around a corresponding axis.

The control terminal 112 can be operatively connected to a display terminal 116 through a wired or wireless connection. The display terminal 116 can be a device that comprises a computing component (not shown) and a visual display 118. The computing component can comprise one or more processors and/or one or more memory storage devices. The processors may be configured to execute instructions in accordance with non-transitory computer readable medium. The memory may comprise non-transitory computer readable media comprising code, logic, or instructions for performing one or more steps described herein. The display terminal can comprise a non-transitory computer readable media comprising program instructions for providing flight display as discussed herein. The display terminal 116 can be a mobile device, such as a smart phone. In some cases, the display terminal 116 can be a desktop computer, laptop computer, tablet, or virtual reality headset. The visual display 118 can include a touchscreen, projector, LCD screen, plasma screen, LED or OLED screen, a television, or a monitor. The display terminal 118 can provide a visual and/or textual representation of flight information such as when the UAV is airborne. In some cases, the display terminal 116 can additionally provide other visual, audio, or other feedback information. The display terminal 116 can be configured to receive user input through a user interactive component, such as a touchscreen, switch, button, key, knob, mouse, pointer, trackball, joystick, touchpad, and the like. In some embodiments, the user interactive component may be the same as the visual display 118. The display terminal 116 can be equipped with one or more sensors such as GPS sensors, inertial sensors, accelerometers, gyroscopes, magnetometers, microphone, visual sensor, infrared sensor, and the like. The user interactive component may receive touch inputs, positional inputs, audio inputs, or visual inputs.

The display terminal 116 can further include one or more receivers configured to receive data to be displayed or data used to generate the displayed data. The receivers may be configured to receive data from one, two, three, or more data transmission sources. The sources can include a UAV 101 (or a component included in or associated with the UAV), a control terminal 112, a server, a network device, a relay station, a satellite, or any other suitable data source.

In some embodiments, the display terminal 116 can be located at a location distant or remote from the UAV and/or the control terminal 112. The display terminal 116 can be disposed on or affixed to a support platform. Alternatively, the display terminal 116 can be a handheld or wearable device. For example, the display terminal 116 can include a smartphone, tablet, laptop, computer, glasses, gloves, helmet, microphone, or suitable combinations thereof.

The control terminal 112 can be in communication with the display terminal 116. Communication between the control terminal 112 and the display terminal 116 can be provided through a wired or wireless connection. A wireless connection can be provided between the control terminal 112 and the display terminal 116 through an RF connection, IR connection, Wi-Fi network, a wireless local area network (WLAN), a cellular network, or any other available wireless network. Alternatively, a wired connection can be provided between the control terminal 112 and the display terminal 116 through a permanent wire connection, coaxial cable connection, Firewire connection, MIDI connection, eSTATA connection, an Ethernet connection, or any other available wired connection that permits data transmission. In some cases, the wired connection can be a connection through a USB cable.

In some embodiments, the control terminal 112 can be configured to provide to the display terminal 116 data received from the UAV such as UAV state information, payload state information, UAV sensing data, and the like. The control terminal 112 can also be configured to provide data based on user inputs to the control terminal 112 such as control commands. The control terminal 112 can also be configured to provide sensing data provided by its own sensors coupled to the control terminal 112. Such sensing data can include GPS data, direction/orientation data, motion information, proximity information, audio/visual data, and the like. The control terminal 112 can also be configured to provide information received from any other suitable sources such as local or remote data stores, servers, satellites, and the like.

In some embodiments, the display terminal 116 can be configured to receive sensing data from sensors coupled to the display terminal 116 such as GPS sensors, inertial sensors, proximity sensors, audio/visual sensors, touch sensors, and the like. Such sensing data can include GPS data, direction/orientation data, motion information, proximity information, audio/visual data, and the like. In some embodiments, the display terminal 116 can also be configured to receive data from sources other than the control terminal 112. For example, the display terminal 116 may be configured to receive information directly from the UAV or a component thereof, local or remote data stores, servers, satellites, and the like. In some cases, the UAV communicates directly with the display terminal 116 without requiring communication with the control terminal 112.

In some embodiments, the display terminal 116 can be configured to process the received data so as to display the data on the visual display 118. Such data processing and/or display functionalities may be performed by one or more processes running on the display terminal 116 such as an application (e.g., mobile app). The processes may be implemented by one or more processors of the display terminal 116. The display terminal 116 may be configured to provide a display of information related to the UAV similar to that described in FIGS. 5-7. In some embodiments, the displayed information may be updated in real-time or nearly real-time to reflected updated received information.

In various embodiments, the communication systems or modules discussed herein may communicate using the same or different communication method. In some instances, a communication method may require line of sight to operate. Alternatively, a different communication method may not require line of sight to operate. Some communication methods can be proximity dependent while other communication methods can be proximity independent. The communication methods can involve wired communication methods, wireless communication methods, or suitable combinations thereof. Wired communication may utilize wires, cables, fiber optics, waveguides, and other suitable physical connections to transmit data. Wireless communication methods may utilize radio waves, infrared waves, sound waves, or light waves to transmit data. In some instances, wired and/or wireless communication methods can involve transmitting data over telecommunication networks, cellular networks, or data networks, which may be local area networks (LANs) or wide area networks (WANs). The networks may include the Internet or Internet-based networks, such as cloud communication networks. Some networks may be public networks, while other networks may be private networks. The data can be transmitted directly between the movable object and a remote terminal (e.g., direct communication, also known as point-to-point communication). Alternatively, the data can be transmitted between the movable object and the remote terminal via one or more intermediate network nodes (e.g., indirect communication). The network nodes may be relay stations, towers, satellites, mobile stations, computers, servers, and the like. The network nodes may be stationary nodes. Conversely, the network nodes may be movable nodes, such as nodes situated on a movable object (e.g., a satellite). Some example of suitable communication methods include: WiFi, WiMAX, coded orthogonal frequency-division multiplexing (COFDM), and mobile or cellular phone networks (e.g., 3G or 4G networks).

As illustrated in FIG. 1, the display used to display fight and state information of the UAV and/or payload can be a display 118 of a display terminal 116 that is separate from the remote control terminal 112. In various embodiments, the display terminal 116 and the remote control terminal 112 may or may not be located at approximately the same location. The display terminal may be configured to display the relative geographical relationship between the display terminal and/or the remote control terminal.

Figure 2:
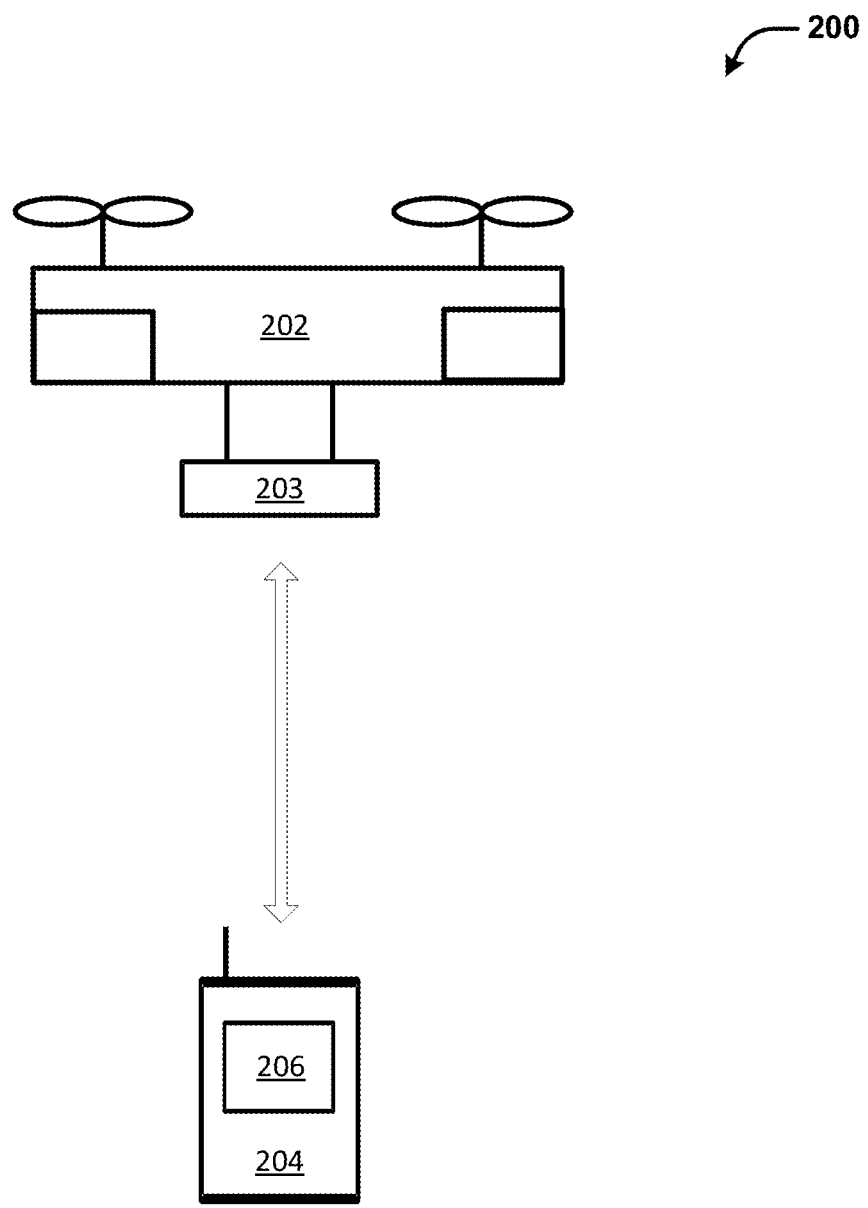
FIG. 2 illustrates another exemplary system for implementing UAV flight display, in accordance with embodiments.

In some embodiments, the display can be integral to the remote control terminal for the UAV. FIG. 2 illustrates another exemplary system 200 for implementing UAV flight display, in accordance with embodiments. As illustrated, a UAV 202 is configured to communicate with a remote terminal 204. The remote terminal 204 can comprise a computing component (not shown) and a visual display 206. The computing component can comprise one or more processors and/or one or more memory storage devices. The processors may be configured to execute instructions in accordance with non-transitory computer readable medium. The memory may comprise non-transitory computer readable media comprising code, logic, or instructions for performing one or more steps described herein. The display 206 can be configured to display flight and state information of the UAV 202, a payload 203 carried by the UAV 202, or any module onboard the UAV. The remote terminal 204 can combined the functionalities of the remote control terminal 112 and the display terminal 116 discussed in FIG. 1. That is, the remote terminal 204 can be configured to act as both a control terminal for the UAV as well as a display terminal of information related to the UAV. For instance, modules configured to implement the functionalities of a control terminal and/or a display terminal can be integrated into one device and/or disposed inside one housing.

As discussed herein, communication with a UAV can include any communication directly or indirectly with any device or system onboard the UAV such as a communication system (e.g., receiver and/or transmitter), payload carried by the UAV, sensor or sensor system, flight control system, and the like. Likewise, flight information related to a UAV can include flight or state information of the UAV itself (e.g., altitude, attitude, position, and speed) or device or system onboard the UAV such as payload (e.g., image capturing device), sensors, propulsion system, communication system, flight control system, power supply system, and the like.

The remote terminal 204 can further include one or more receivers configured to receive data to be displayed or data used to generate the displayed data. The receivers may be configured to receive data from one, two, three, or more sources. The sources can include the UAV 202 itself (or a component included in or associated with the UAV), a server, a network device, a relay station, a satellite, or any other suitable data source.

Figure 3:
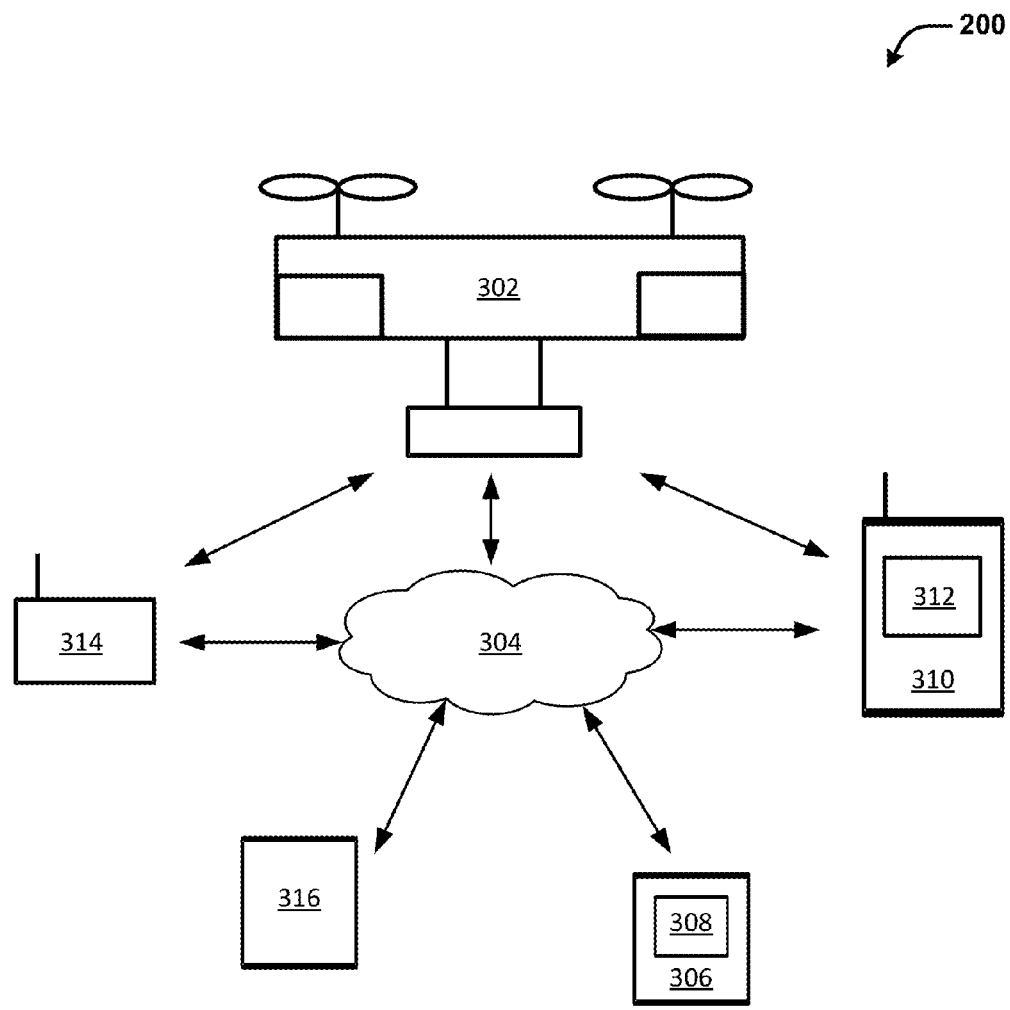
FIG. 3 illustrates another exemplary system for implementing UAV flight display, in accordance with embodiments.

In various embodiments, data necessary for the display of flight information related to a UAV can be transmitted directly or indirectly to a remote display terminal as illustrated in FIGS. 1-2. In some embodiments, some or all portions of the data path between the UAV and the display terminal may be point-to-point and/or via one or more intermediary devices. FIG. 3 illustrates another exemplary system 300 for implementing UAV flight display, in accordance with embodiments. As illustrated, a UAV 302 can be configured to provide data, directly or indirectly, to a remote display terminal 306, 310 with respective displays 308, 1412. The UAV 302 may be configured to provide data directly, e.g., via a point-to-point communication channel, to a remote display terminal 310. In other words, the remote display terminal 310 may be configured to communicate directly with the UAV 302. Alternatively or additionally, the UAV 302 may be configured to provide data indirectly to a remote display terminal 306, e.g., via one or more intermediary devices 314, and/or via one or more networks 304. The intermediary devices can include devices 314 that are configured to communicate directly (e.g., via a point-to-point communication channel) with the UAV or devices 316 that are configured to communicate indirectly with the UAV. In various embodiments, the intermediary devices 314, 316 can include remote controllers, network devices (e.g., routers, network access points, servers), satellites, relay stations, and the like. At least some of the remote display terminals and the intermediary devices may include mobile or portable (e.g., mobile phone, laptop, tablet, handheld controller). Alternatively, at least some of the remote display terminals or intermediary devices may be stationary (e.g., ground station, base station, workstation, cellular tower). In various embodiments, the networks 304 can include any suitable communication network such as the Internet, local area network (LAN), wide area network (WAN), wireless network, cellular network, satellite network, public switched telephone network (PSTN), public or private network, virtual private network (VPN), ad-hoc network, and the like, or any combination thereof.

Besides data directly or indirectly provided by the UAV (or a component thereof), the display terminals may also be configured to receive data from other sources such as control terminals, servers or online services, data stores, satellites, or any other suitable devices or systems. Such data may include positional information of control terminals, for example. Such data, along with the UAV data, can be displayed on the display terminal with or without further processing. For example, the display terminal may be configured to display the relative positions of the UAV and a remote control terminal based on positional information from both the UAV and the remote control terminal. As another example, the display may be configured to display the real-time position of the UAV on a map based on the processing of both map data and position data of the UAV. The map may be generated based map data received from a remote data server, data stores, and the like. The real-time position of the UAV may be received from the UAV, a remote server, a remote sensor system, and the like.

In various embodiments, any data processing required for the display of flight information as discussed herein may be implemented by the display terminal itself, one or more devices separate from the display terminal, or any combination thereof. In an example, the display terminal can be a "dummy" or "thin" terminal that is only capable of displaying information and incapable of complex data processing. In this case, most if not all of the display data may be generated by other devices or systems as opposed to the display terminal. In another example, the display terminal can be capable of performing more data processing than dummy terminals. In such a case, most if not all of the display data may be generated by the display terminal itself. For example, the display terminal may be capable of running applications (e.g., mobile apps). In yet another example, the data processing may be split between the display terminal and some other system or device that is operatively connected to the display terminal. For example, display terminal may be configured to run a front end application that communicates with a back end application that runs on a remote server. In various embodiments, the actual allocation of the data processing may depend on the software/hardware characteristics of the display terminal and/or other devices or systems, the amount of processing, the load of the respective devices, and other factors.

Figure 4:
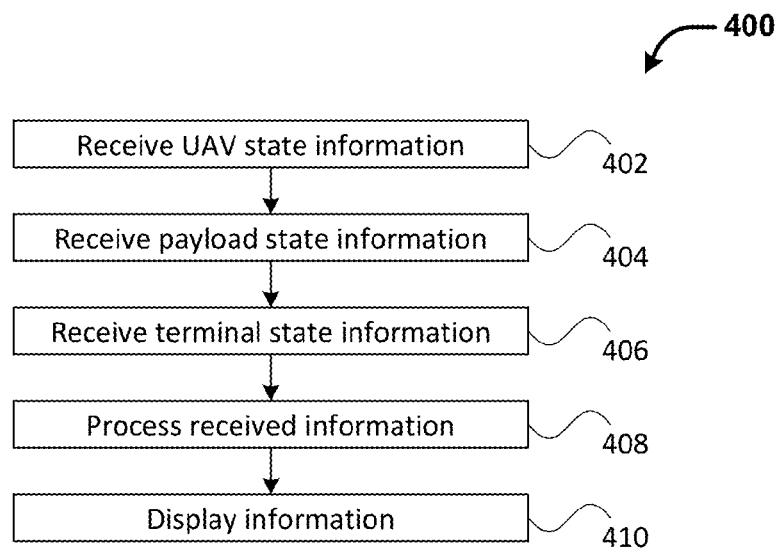
FIG. 4 illustrates an exemplary process for implementing information display, in accordance with embodiments.

FIG. 4 illustrates an exemplary process 400 for implementing information display, in accordance with embodiments. Aspects of the process 400 may be performed by one or more processors onboard the UAV, one or more processors offboard the UAV, or any combination thereof. For example, the process 400 can be implemented by one or more processors in a remote display terminal, a server, or a combination thereof. Some or all aspects of the process 400 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

In an embodiment, the process 400 includes receiving 402 data representing UAV state information. The UAV state information can be related to a spatial disposition of the UAV such as attitude information of the UAV. For example, the UAV attitude information can include a spatial orientation of the UAV around one or more axis such as pitch, yaw, and roll. The state information can also include a bearing of the UAV that can be related to the yaw orientation of the UAV.

The UAV state information can also include UAV position information such as GPS coordinates, latitude and/or longitude, altitude, distance or other relationship to one or more reference points, and the like. The reference points can include objects with predetermined position information or configured to actively emit position information such as preset home point for the UAV to return, base or ground stations, mobile terminals (e.g., handheld remote terminals and/or mobile display terminals), self-identifying targets (e.g., GPS enabled vehicles, buildings), and the like. The reference points can also include objects or obstacles in the UAV's surrounding environment that are not configured to actively transmit position information such as manmade or natural landmarks (e.g., buildings, trees).

Any state information discussed herein can be relative to a reference frame. The reference frame can be a fixed reference frame (e.g., earth, the surrounding environment). Alternatively, the reference frame can be a moving reference frame (e.g., the movable object, a payload target). In various embodiments, state information can be determined using any suitable coordinate system such as Cartesian coordinate system, homogeneous coordinate system, Polar coordinate system, cardinal directions (e.g., North, East, South, West), and the like.

The UAV state information can also include information about the movement of the UAV such as speed and/or acceleration information. The movement information can be relative to any suitable reference frame such as ground or wind. For example, the movement information can include a groundspeed, airspeed, horizontal speed, and/or vertical speed of the UAV. In some embodiments, the state information can both speed and acceleration information, only one of the two, or neither. Alternatively or additionally, the UAV state information can include information about a power supply, communication system, propulsion unit, and any other component of the UAV.

The UAV state information can be generated based on sensing data from one or more sensors of the UAV including inertial sensors and motion sensors (e.g., accelerometer, gyroscopes, visual sensor, speedometer), position sensors (e.g., GPS sensor, compass, magnetometer), proximity sensors (e.g., lidar, ultrasound, infrared, and/or visual sensors), image or visual sensors, and the like. For example, the UAV attitude information may be generated based on sensing data from the inertial sensors. The bearing of the UAV may be measured by a compass or magnetometer. The location of the UAV may be measured by a GPS sensor. In some embodiments, a proximity to one or more reference points may be provided. The proximity may be calculated based on known position information of the UAV and the reference points. The proximity may also be calculated based on sensing data from one or more proximity sensors. In some embodiments, the maximum and/or minimum range of object detection is based on the characteristics of the proximity sensors such as the maximum and/or minimum range of the sensors or the accuracy of the sensors.

In some embodiments, the process 400 can optionally include receiving 404 state information of a payload carried by the UAV. The payload can include an image capturing device such as a camera, camcorder, infrared device, or the like. The payload state information may include a spatial disposition (e.g., position, orientation, or attitude), a velocity (e.g., linear or angular velocity), an acceleration (e.g., linear or angular acceleration), and/or other information about the carrier, a component thereof, and/or the payload. The payload state information can include attitude information describing the payload's orientation relative to a yaw, pitch, and/or roll axis. As discussed herein, a carrier may allow the payload to move rotationally and/or translationally relative to the UAV (e.g., via a carrier described herein). As such, the spatial disposition and/or attitude of the payload may not be the same as that for the UAV. In some embodiments, the payload state information can also include information about other aspects of the payload such as its operational parameters. Such operational parameters can be related to the payload's power supply, data storage, optical components, or the like. For example, the operational parameters can be indicative of available battery, available amount of data storage, focal length, zoom level, image resolution, depth of field, exposure, lens speed, or field of view (FOV), on/off state of the payload, snapshot/video mode, and the like. In some embodiments, the payload state information may be provided based on sensing data from one or more sensors.

In some embodiments, the payload state information as acquired or calculated from sensing data provided by one or more sensors associated with the payload and/or carrier. Examples of such sensors may include motion sensors (e.g., accelerometers), rotation sensors (e.g., gyroscope), inertial sensors, and the like. The payload/carrier sensors may be coupled to any suitable portion or portions of the carrier (e.g., frame members and/or actuator members) and may or may not be movable relative to the UAV. Additionally or alternatively, at least some of the carrier sensors may be coupled directly to the payload carried by the carrier.

Information from the payload can include or be part of the information from the UAV. In some embodiments, the payload state information can be received separately from the UAV state information. For instance, the payload state information and the UAV state information may be provided by two, three, or more separate communication modules. In some other embodiments, at least some of the payload state information and the UAV state information can be received together. For example, the payload state information and the UAV state information may be transmitted by the same communication module.

In some embodiments, the UAV state information and the payload information can be provided by devices or systems that are onboard the UAV. Alternatively, at least some of the information related to the UAV and/or the payload can be provided by devices or systems that are external and/or remote to the UAV. For example, the state of the UAV (e.g., position) may be monitored by one or more remote sensors and sensing data from such remote sensors may be provided to the display terminal. As another example, images data and/or sensing data from the UAV may be received and/or processed by a remote device before being provided to the display terminal.

In some embodiments, image data or other sensing data captured by the payload or other sensors may be provided to a remote terminal such as a remote control terminal, remote display terminal, or a remote server. The image data may include raw image data as captured by the payload and/or processed data such as pre-processed by a pre-processing unit (e.g., field programmable gate array (FPGA)) associated with an image sensor, and/or further processed by one or more processing units onboard of the UAV. The pre-processing units may be configured to pre-process the raw image data to perform re-sampling, noise reduction, contrast enhancement, scale space representation, and the like. The processing units may be configured to further process the pre-processed data to perform any suitable image processing tasks such as feature extracting, image matching, image stitching, and the like.

Optionally, the process 400 can include receiving 406 state information of a remote terminal. The remote terminal can include a remote control terminal used to control the UAV and/or a remote display terminal used to display information about the UAV. The state information of the remote terminal can include position information (e.g., GPS coordinates), orientation information (e.g., relative one, two, or three axes), communication information (e.g., signal strength), like. The received state information of the remote terminal can be used to determine and/or display a relationship between the UAV and the remote terminal such as relative bearing, distance, and the like. In cases where the remoter terminal includes or is included by the display terminal, the state information can be the same as or approximate to the state information of the display terminal. In other cases, such as when the remote terminal is separately located from the display terminal, the state information of the remote terminal may not be the same as the state information of the display terminal. In some embodiments, the remote terminal state information can be received by a remote control terminal, remote display terminal, an integrated remote terminal that combines the functionalities of a remote control terminal and a remote display terminal, an intermediate terminal, or the like. In some embodiments, the remote terminal state information is received by a software component (e.g., an application process), a hardware component, or a combination thereof.

In various embodiments, the remote terminal state information may be provided by one or more sensors such as inertial sensors, position sensors, proximity sensors, and the like. The sensors may be attached to or operatively connected to the remote terminal configured to receive the state information. Alternatively, the sensors may be separate from the remote terminal. For example, the sensors may be coupled to objects surrounding the remote terminal. Alternatively or additionally, the remote terminal state information may be provided by remote servers, data stores, satellites, or any other devices or systems.

The process can optionally include processing 408 the received information in order to eventually display the information. In some embodiments, information from multiple information sources may be combined, compared or crosschecked, filtered, or otherwise processed. For example, state information (e.g., position) may be provided by multiple sensors or devices located at different places. Such information may be combined to obtain a more comprehensive view of the state of the object. Alternatively, additional information may be selectively extracted from the received information based on predetermined criteria. For example, sensing data from higher-precision sensors may be preferably selected over sensing data from lower-precision sensors.

In an embodiment, the received information can be used to calculate information to be displayed. For example, the relative distance between the UAV and a reference point (e.g., home point, remote terminal) can be calculated based on the position information such as the GPS coordinates of the UAV that that of the reference point. As another example, the GPS coordinates of a series waypoints on a UAV's flight path may be used to display a continuous flight path.

In various embodiments, the processing 408 can be performed, individually or collectively, by one or more processors disposed in one, two, three, or more devices and/or systems. The devices and/or systems can include, for example, a movable object (e.g., UAV), remote control terminal, a remote display terminal, a base station, an intermediate terminal, a cloud-computing system, and the like.

The process 400 can include displaying 410 at least some of the received information that may or may not have been processed. In various embodiments, the displayed information may be generally include or related to a UAV, a payload carried by the UAV, images or other sensing data captured by the payload and/or the UAV, a remote terminal (e.g., control terminal for the UAV and/or payload), environment surrounding the UAV, and/or any combinations thereof. The information may be displayed in a user interface in an intuitive and efficient manner, as discussed in further details in FIGS. 5-7.

For instance, various types of the information discussed herein may be displayed simultaneously on the same screen or the same user interface so as to give the user a comprehensive view of all pertinent information. In an example, the UAV state information and the payload state information may be displayed simultaneously on the same screen of the display terminal. In another example, the UAV state information and/or payload state information may be displayed together with information (e.g., position and/or attitude) about a remote terminal (e.g., control terminal) so as to provide an intuitive illustration of the relative relationship between the objects. As yet another example, the UAV state information, payload state information, and/or the remote terminal information can be displayed simultaneously with real-time images captured by the payload and/or other sensing data about the UAV so as to allow the user to intuitively control the navigation of the UAV and/or orientation of the payload (e.g., via control of the carrier). As another example, a map showing both the position of the UAV and a FOV of the payload may be provided enabling a user to easily determine the range of landscape that can be captured by images of the payload.

In some embodiments, regions for displaying the various types of the information discussed herein may or may not overlap to improve screen efficiency. The overlapping regions may be provided as transparent, semi-transparent, or opaque layers. For instance, the regions for displaying UAV state information and payload state information may overlap such that an area can be used to display both kinds of information. As another example, the UAV and/or payload state information can be displayed in a layer that is superimposed on top of images captured by the payload.

In some embodiments, the display can be customized based on user preferences and/or user inputs. For example, the user may provide one or more parameters defining the content and/or the layout of the information to be displayed. For example, the user may specify the amount, type, unit or metric system, and other relevant parameters regarding the information to be displayed. As another example, the user may specify the font, color, size, shape, position, format, layout of the user interface (UI) components used to display the information. In some embodiments, the user interface used to display information may also be used for a user to provide information. Such information may be used to control aspects of the UAV, payload, and the like.

At least some of the steps described above can be implemented in real or nearly real time. For example, state information about the UAV and/or payload, images captured by the payload, sensing data, and/or other information may be received in real or nearly real time as such information is generated. Likewise, the received information may be processed in real or nearly real time as it is received. The display of the received information may occur in real or nearly real time. Finally, the display may be updated in real or nearly real time as to reflect updated information is received. Alternatively, there may be some delay in some or all of the steps above. In various embodiments, some or all of above steps may be implemented either when the UAV is airborne or when the UAV is not airborne.

In general, any step of any process discussed herein for implementing UAV flight display can be implemented, individually or collective, by one, two, three, four, or more devices or systems. Such devices or systems can include a display terminal, a remote control terminal, a server, a cloud-based system, or any other suitable devices or systems. In an example, all of the steps above may be implemented by the same device or system. Data used to for UAV flight display may be received by one, two, three, or more devices and/or systems. Data processing required for UAV flight display may be performed by one, two, three, or more devices and/or systems that may or may not overlap with the devices and/or systems used to receive the data. Finally, the display of the UAV flight data may be performed by one, two, three, or more devices and/or systems that may or may not overlap with the devices and/or systems used to receive and/or process data. As an example, the state information of the UAV and/or the payload may be received by a first device, the information may be processed by a second device, and the processed information may be displayed by a third device.

Figure 5:
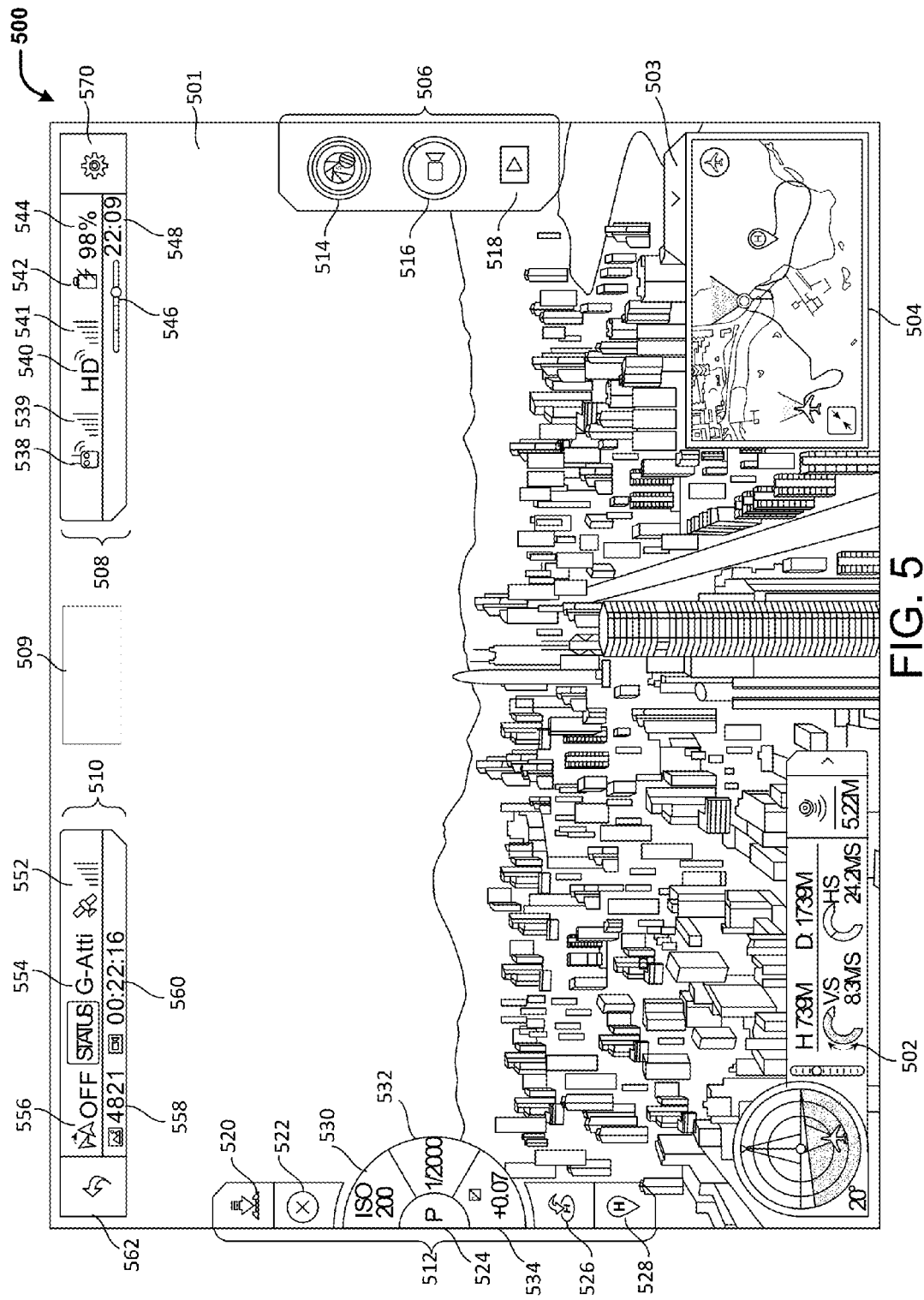
FIG. 5 illustrates an exemplary user interface (UI) displayed on a remote display terminal, in accordance with embodiments.

FIG. 5 illustrates an exemplary user interface (UI) 500 that may be displayed on a remote display terminal, in accordance with embodiments. The remote display terminal may be similar to the remote display terminals discussed in FIGS. 1-3. For instance, the remote display terminal may include a display that is separate from or be integral to a remote control terminal. The remote display terminal may be the same as or a part of the remote control terminal.

In some embodiments, the UI may comprise one or more primary display areas or sections 501 and one or more secondary display areas or sections 502, 504, 506, 508, 510, 512. The primary display area 501 may be configured to have a larger display area (e.g., more pixel counts) than any one of the secondary display sections. In some embodiments, the type of information displayed in the primary and/or secondary display areas is fixed. For instance, as illustrated in FIG. 5, the primary display area 501 can be used to display image data captured by a payload coupled to the UAV such as still pictures or videos, whereas the secondary display areas can be configured to display information related to a UAV and/or for receiving user input. In some other embodiments, the type of information displayed in the primary and/or secondary display areas can be dynamically swapped or toggled. For instance, information displayed in the primary display area 501 can be dynamically swapped with information displayed in a secondary display area. As an example, a user may click on a secondary display area such as a map display 504 shown in FIG. 5, and in response, the information displayed in the map display 504 is displayed in the primary display area 501 while the image data previously displayed in the primary display area 501 is now displayed in the secondary display area 504. Similarly, the display between the primary display area 501 and the secondary display area 504 may be swapped again if the user again clicks on the secondary display area 504. In various embodiments, the user may toggle or swap the display via any suitable input mechanisms such as touchscreen, mouse, keyboard, voice command, and the like. In some embodiments, information displayed in one primary display area can be dynamically swapped with information displayed in another primary display area. Information displayed in one secondary display area can be dynamically swapped with information displayed in another secondary display area.

For illustrative purposes only, the following discussion sometimes refer to the primary display area 501 as an image section for displaying images captured by a payload coupled to the UAV such as still pictures or videos. The images displayed on in the image section can be provided in real or nearly real time. Further, the one or more secondary display areas 502, 504, 506, 508, 510, 512 are sometimes referred to as information sections or regions for providing and/or receiving information related to a UAV. However, it is understood that the relative positions and/or sizes for image section and the information sections can be dynamically swapped, toggled, or otherwise modified as described above.

The primary display area 501 can overlap at least in part with some of the secondary display areas. For example, a secondary display area can be displayed as an opaque or transparent layer that is superimposed on or embedded in the primary display area. In alternative embodiment, the primary display areas may not overlap with any of the secondary display areas. Overlapping display regions can facilitate more efficient use of screen space, especially for small screens such as those on mobile display terminals.

In some embodiments, the layout of the primary display areas and the secondary display areas can be designed to emphasize and/or reduce interference with content displayed in the primary display area. For example, the primary display area can take up the entire screen or most of the screen whereas the size of the information sections can be relatively small and arranged along the peripheral and/or border of the screen so as to be less intrusive. The information displayed in the secondary display areas or information sections can also be selected such that only the most critical, useful, or relevant information is displayed. In some embodiments, at least some of the secondary display areas or information sections can be collapsed and/or hidden so as to allow the user to get a better view of the remaining areas of the UI. The secondary display areas or information sections can also be expanded and/or shown so as to allow the user to view information displayed in these sections. In some embodiments, a secondary display area or information section can include a control such as a toggle control 503 for toggling between a hidden mode and an expanded mode. The toggle control 503 may be displayed outside the associated content display area 504 such as shown in FIG. 5. Alternatively, the toggle control can be displayed inside the associated content display area so such that no additional space is taken up by the display of the toggle control.

In some embodiments, the user may be allowed to interact with some or all of regions of the UI via one or more input mechanisms such as touchscreen, mouse, keyboard, joysticks, stylus, wearable devices, visual or audio commands, and the like. The user input provided via the UI may be used to control aspects of the display and/or display terminal, the UAV, the payload, the remote terminal, sensors, and the like.

In various embodiments, the FOV and/or the line of sight of the payload may or may not be aligned with the direction the UAV is heading. For example, the FOV and/or line of sight of the payload may be at an angle with the UAV's heading along a yaw, pitch and/or roll axis. The angle may be greater than 0 degree, 30 degrees, 60 degrees, 90 degrees, 120 degrees, 150 degrees, 180 degrees, 210 degrees, 240 degrees, 300 degrees, and the like.

The information sections can include a flight display section 502, a map section 504, one or more control sections 506, 512, and one or more additional display sections 508, 510. The flight display section 502 can be used to display position, attitude, speed, and other flight information related to the UAV. In particular, the flight display section 502 can be configured to simultaneously display both UAV state information and payload state information. The fight display section is discussed in further detail in FIG. 6.

The map section 504 can be used to display the current position and/or orientation of the UAV on a map (e.g., satellite map). The map can be further configured to indicate the current position and/or orientation of a remote control terminal, a home point, a flight path of the UAV, and the like. Additionally, the map can be configured to indicate the orientation and/or angle of a FOV of an image sensor on the UAV. In some embodiments, map section 504 can be displayed as an inset of the image section 501 in a picture-in-picture fashion. In other embodiments, the map section 504 may not overlap the image section 501. The map section is discussed in further detail in FIG. 7.

The UI can also include one or more control sections 506, 512 each including controls for selecting, activating, deactivating, modifying, or otherwise controlling one or more modes, operations, or routines of the UAV and/or components thereof. In some embodiments, control data generated based on selection of the controls can be transmitted directly or indirectly to the UAV so as to control one or more aspects of the UAV and/or the payload. At least some of the controls can be represented by graphical icons illustrative of the modes or operations associated with the controls. The graphical icons can be designed to facilitate intuitive understanding of the function of the controls without the help of any textual description. Furthermore, such "one-touch" or "one-click" control interface can simplify the process for a user to provide control, such as for selecting, activating, deactivating or otherwise controlling aspects of the UAV and/or payload. For instance, as discussed herein, the user can use such "one-touch" or "one-click" controls to activate a predetermined and/or autonomous routine such as auto-return, autonomous takeoff, autonomous landing, hovering, and the like.

In some embodiments, the UI can be used to allow a user to remotely control the payload onboard the UAV such as when the UAV is airborne. For instance, the control section 506 can include a one or more controls for selecting a mode of the payload such as an image capturing device. For example, the mode selection controls 514, 516, and 518 can correspond to a camera mode, a video mode, and a review mode, respectively. Selection of a mode selection control causes the payload to enter into the mode corresponding to the mode selection control. For instance, selection of the camera mode control 514 causes the payload to go into a camera mode for capturing still photos. A selection of the video mode control 516 causes the payload to enter into a video mode where a video can be recorded. A selection of the review mode control 518 causes the payload to enter into a review mode where images or videos previously captured by the payload may be made available for review. In some embodiments, the selection of the camera mode control 514 causes a plurality of additional camera controls to be displayed for controlling aspects associated with taking still photos. Such additional camera controls may be used to control a shooting mode of the camera. For example, controls may be provided for activating a single shot mode, burst mode (where multiple shots are taken in succession), bracketing mode (where multiple shots are taken with different camera settings such as exposure), timed shot mode (where one or more shots are taken with a predetermined delay), and the like. Under bracketing mode, one or more controls may be provided for setting a number of shots (e.g., three, five, or seven) to be taken under the bracketing mode. In some embodiments, the UI may allow the user to remotely control the carrier that couples the payload to the UAV so as to cause a change in an attitude of the payload. For instance, the UI may allow the user control the carrier so as to cause a rotation of the payload around a yaw, pitch, and/or roll axis.

In some embodiments, the UI described herein can be used by a user to control aspects of one or more autonomous tasks that can be performed by the UAV, payload, or a component thereof. An autonomous task can be initiated by a user. After an autonomous task is initiated by a user a UAV may not require additional control or input from a user while the autonomous task is performed. An autonomous task may cause a UAV to enter a predetermined sequence. The predetermined sequence may include a series of actions that do not require user input.

The control section 512 can also include one or more controls 520, 522, 524, 526, 528 for controlling other aspects of the UAV and/or payload. For example, the takeoff/landing control 520 can be used to activate or deactivate the execution of an autonomous takeoff and/or landing routine by the UAV. The autonomous takeoff and/or landing routine, when initiated, can cause the UAV to engage in a sequence of predetermined actions (e.g., involving its propulsion system, sensors, flight control system, and the like) so as to takeoff and/or land without any or with minimal human intervention. The carrier mode control 522 can be used to specify a mode for controlling a carrier. The carrier couples a payload to the UAV and may permit the payload to move relative to the UAV. The carrier mode can be selected from a plurality of modes including head-following mode, first-person view (FPV) mode, free control mode, one key return mode, gesture control mode, fine-tune roll control mode, and the like.

The control section 512 can also include a plurality of payload configuration controls 524, 530, 532, 534, for setting various configuration or operational parameters of the payload (e.g., image capturing device such as a camera). For example, the film speed control 530 can be used to display the current film speed of an image capturing device and/or selecting or specify a new film speed (e.g., ISO 200, ISO 400, ISO 600, ISO 800, ISO 1000). The shutter speed control 532 can be used to display the current shutter speed of the image capturing device and/or selecting or specify a new shutter speed (e.g., $1/16000$ s, $1/8000$ s, $1/4000$ s, $1/2000$ s, $1/10000$ s, $1/500$ s, $1/250$ s, $1/125$ s, $1/60$ s, $1/30$ s, $1/15$ s, $1/8$ s, $1/4$ s, $1/2$ s). The exposure compensation control 534 can be used to display and/or adjust an exposure associated with the image capturing device. The display toggle control 524 can be used to display more or less payload configuration controls. For example, additional payload configuration controls other than shown in FIG. 5 may be display upon selection of the display toggle control 524 under an expanded mode. Under the expanded mode, selection of the display toggle control 524 may cause display of few controls (such as illustrated in FIG. 5) under a collapsed mode. In some embodiments, the plurality of payload configuration controls 530, 532, and 534 can be arranged in a substantially semi-circular fashion to improve usability, user friendliness, and/or screen efficiency. In other embodiments, the payload configuration controls may be arranged in any other suitable fashion.

The control section 512 can also include an auto return control 526 that allows a user to activate and/or deactivate an auto return routine, for example, with a single click or selection of the auto return control. The auto return routine, when initiated, can cause the UAV to engage in a sequence of predetermined actions (e.g., involving its propulsion system, sensors, flight control system, and the like) so as to return autonomously to a predetermined home point without any or with minimal human intervention. The home point can be the takeoff point for the UAV or any arbitrary point with known location. The home point may be specified by a user or provided by default. In some embodiments, the home point for the auto return routine may be set via the home setting control 528. The home setting control 528 may provide options for the user to set the home point. For example, selection of the home setting control 528 may cause three additional home setting controls (not shown) to be provided. One of the additional home setting controls may allow a user to select the current position of the UAV, the remote control terminal, or any other suitable object as the home point. Another one of the additional home setting controls may allow the user to set the takeoff point for the UAV as the home point. Yet another one of the additional home setting controls may allow a user specify that the home point should follow a dynamically movable object such as the remote control terminal and/or the remote display terminal. When this control is selected, the home point may be automatically updated on a periodic basis (e.g., every 2, 4, 8, 10, or 20 seconds) to be the current location of the specified movable object. Alternatively, the home point may be updated only in response to certain user events such as the selection of the auto return control 526.

The UI 500 can also include one or more additional information display sections 508, 510. The display sections can be configured to display various status information related to power supply, communication, data storage capacity, navigation state, sensor state, and the like. The display section 508 can also include one or more status indicators of various communication channels with the UAV. For example, the status of an uplink or control channel (communication channel or link used for the transmission of remote control signals from a remote controller) can be represented by a controller icon 538 along with a bar chart 539, a number (e.g., from 0 to 100), or any other suitable indicator of a status or condition of the control channel. The status of a downlink or data channel (communication channel or link used for the transmission of data such as image data from the UAV) can be represented by a data transmission icon 540 (e.g., an "HD" icon) along with a bar chart 541, a number (e.g., from 0 to 100), or any other suitable indicator of status and/or condition of the data channel. The status or condition of the control and data channels may indicate the signal strength, noise, interference, signal-to-noise ratio (SNR), bit error rate, fading rate, and other characteristics of the communication channels.

The display section 508 can also include one or more indicators of power supply for the UAV, or a component thereof. Such indicators may include a battery icon 542 along with a numeric indicator 544 of the remaining battery power. Additionally or alternatively, the power supply indicators can also include a scrollbar indicator 546. The scrollbar can include a plurality of segments each indicating a corresponding state related to the battery power. In one embodiment, each segment of the scrollbar corresponds to a particular range of percentage of battery power. For example, the first segment can indicate 0-25% (very low) of the battery power. The second segment can indicate 20%-50% (e.g., low) of the battery power. A third segment can indicate 50%-100% (e.g., medium high) of the battery power. In other embodiments, the scrollbar may include more or less than three segments and the percentage ranges of the segments may be different than those illustrated herein.

In some embodiments, the multiple segments can be visually distinguishable from each other such as by color, pattern, position, or any combination thereof. For example, the first, second, and third segments (from left to right or right to left) can be displayed in red, yellow, and green, respectively. The position of the scroll pointer on the scrollbar can correspond to the current level of available battery power. Advantageously, the multi-segmented scrollbar allows a user to easily and intuitively identify the proximate level of battery power (e.g., whether it is very low, low, medium, or high) without having to know the exact percentage.

In another embodiment, each segment of the scrollbar can indicate a level of flight safety associated with a particular trip and/or a particular distance based on the current battery power. For example, each segment may indicate whether the UAV can safely reach a particular destination from the current position with the current battery power. The destination may be predetermined or dynamically assigned (e.g., by a remote user). The destination may include a home point, a location associated with a remote terminal (e.g., a remote control terminal), a takeoff point for the UAV, or any arbitrary point that is set (e.g., by a remote user or an automated process onboard or offboard the UAV) before the UAV took off or while the UAV is airborne. Alternatively or additionally, the segment can indicate whether the remaining battery power is sufficient to enable the UAV to fly a particular distance. The value of the distance may be predefined (e.g., 100 m, 500 m, 1000 m). The value of the distance may be dynamically specified by a user such as via a remote control terminal. The value of the distance may be dynamically calculated based on the current position of the UAV and a destination point. As discussed above, the segments may be visually distinct (e.g., by their relative positions, color, pattern, and the like) to enable quick identification by the user. For instance, in an embodiment, a first segment (e.g., in red and/or at one end of the scrollbar) may indicate that insufficient battery power to reach a particular destination or distance. The first segment can indicate that immediate landing of the UAV is required. In some embodiments, an auto landing routine is automatically executed within a predetermined period of time (e.g., 2 seconds, 5 seconds, 10 seconds, 20 seconds) absent explicit user control. In other embodiments, no auto routine is executed. A second segment (e.g., in yellow and/or next to the first segment) may indicate that the battery power is sufficient to reach a particular destination or distance but not much more. The segment may indicate that the UAV should be controlled to reach the particular destination (e.g., home point) or distance soon. In some embodiments, an auto return routine is automatically executed within a predetermined period of time (e.g., 2 seconds, 5 seconds, 10 seconds, 20 seconds, 1 minute) absent explicit user control. In other embodiments, no auto routine is executed. A third segment (e.g., in green and/or next to the second segment) may indicate that the battery power is plenty to reach a particular destination or distance and beyond. In various embodiments, the level of automatic intervention (e.g., auto landing routine or auto return routine) associated some of the segments may be hardcoded or configurable (e.g., by a user). In some embodiments, audio, visual, tactile, or other kinds of feedback signals may be provided when battery status falls within one or more of the segments discussed above. The feedback signal may be provided from a remote terminal (e.g., remote control terminal and/or remote display terminal) or the UAV. For instance, when scrollbar indicator is within the second segment, audio warnings such as beeping sounds or voice commands (e.g., "Please return UAV to home as soon as possible.") may be provided to alert or instruct the user with respect to the status of the battery and/or navigation of the UAV.

The position of the scroll pointer on the scrollbar and/or the length/size of each segment can change dynamically based on the current battery power and/or the distance between the current position of the UAV and a particular destination. When the destination changes, the scrollbar pointer and/or the length/size of the segments can also change accordingly. For instance, as discussed above, a user can dynamically set or modify the home point for the UAV while the UAV is airborne, such as by using the home setting control 528. When a user sets a different home point, the current distance between the UAV and the new home point may be calculated and used to update the battery scrollbar display accordingly. Such update may include adjusting the position of the scroll pointer on the scrollbar. Additionally or alternatively, such update can include changing the length of some or all of the segments of the scrollbar. For example, if the new home point is further away from the UAV than a previous home point, then the scrollbar pointer can be moved closer toward the first segment end of the scrollbar to indicate that the UAV has less flight time before it can safely return to the new home point. Alternatively or additionally, the length of one or more segments can be adjusted such that the scrollbar pointer now falls within a segment that indicate that the UAV has less flight time before it can safely return to the new home point. For example, if the pointer was previously in the third segment, the third segment can be shortened or the second segment can be lengthened such that the pointer now falls in the second segment, or the pointer still falls in the third segment but closer to the second segment. If the pointer was previously in the second segment, the second segment can be shortened or the first segment can be lengthened such that the pointer now falls in the first segment, or the pointer still falls in the second segment but closer to the first segment. In some embodiments, the scrollbar display can be adjusted by updating both a position of the scrollbar pointer and a length of a segment of the scrollbar.

Compared with the embodiment where the scrollbar merely represents the percentage of battery power, this embodiment provides a "smarter" or more useful representation of the battery power—the ability of the UAV to reach a particular destination or distance—in a precise and real-time fashion, so that the user does not have to do the calculation or estimation herself, which could be slow and/or inaccurate. Such battery indicator allows a user to make quicker decisions which in turn ensures better flight safety for the UAV.

The power supply indicators can also include a time indicator 548 that shows an approximate flight time. The flight time can represent the time of flight using the remaining power supply. The flight time can represent the amount of time before the UAV need to start returning to a particular destination (e.g., home point) to ensure that the destination can be reached safely. The flight time can also represent the amount of time before the UAV need to land to ensure safety. The flight time can also represent the amount of time before an automated routine (e.g., auto landing or auto return) is initiated. Advantageously, the time indicator 548 provides important flight status information (e.g., remaining flight time) derived based on the battery status so as to enable the user to take quick actions.

In some embodiments, a flight status indicator 509 can be provided to indicate a flight status of the UAV. The flight status may be determined based on the current status of components of the UAV such as power supply, propulsion unit, memory, software and/or hardware components, and the like. The flight status indicator 509 can be configured to display different colors, patterns, texture, texts, or any combinations thereof to represent different flight status. For instance, the color green can be used to indicate a safe flight status. Other colors such as yellow and red can be used to indicate a more dangerous flight status. Alternatively or additionally, different textual content can be displayed by the flight status indicator 509 corresponding to different flight status. For instance, "Safe Flight" or similar text can be displayed to indicate safe flight. "Dangerous Flight" or other warning messages can be displayed to indicate a more dangerous flight. In various embodiments, the flight status indicator 509 can be disposed between the display sections 508 and 510, or anywhere else on the UI. The flight status indicator 509 may be always displayed, or only displayed in response to certain predetermined conditions, events, user actions, or the like. For instance, in some embodiments, the flight status indicator 509 may be only displayed when the UAV is near or under a dangerous flight status. As another example, the flight status indicator 509 may be displayed only when the user selects or otherwise activate a UI control.

The display section 508 can also include a setting control 570 that may be used by a user to provide configure general settings. Selection of the setting control 570 can cause display of additional controls used for controlling additional aspects or for displaying additional information. For example, the additional controls may be used to reformat a storage medium (e.g., SD card), restore default settings, display version information, and the like associated with the UAV, payload, remote terminal, or the like.

The display section 510 can include a GPS indicator 552 comprising a satellite icon and a bar chart indicating the strength of the GPS signals. The GPS indicators 552 may alternatively or additionally include a number (e.g., 12) of satellites in view.

The display section 510 can also include a navigation mode indicator 554. For example, the navigation mode indicator 554 can be used to indicate that the navigation is based on GPS (as illustrated in FIG. 5), vision, or both. In various embodiments, the navigation may be performed based on sensing systems other than GPS and vision, such as inertial measurement unit (IMU), proximity sensors (e.g., lidar, infrared, ultrasound), and the like. The navigation mode can be selected to be based on any suitable sensing system or any combinations thereof. The navigation mode can be determined automatically by a process running on the UAV (e.g., by a flight control module), selected remotely by a remote user via a remote control terminal, or a combination thereof. The allocation of control between the user and the UAV can be changed dynamically based on the environment of the UAV. For example, more UAV autonomy and less user intervention may be required when the UAV is within a relatively simple environment (e.g., in an outdoor and/or open space). Conversely, more UAV autonomy and less user intervention may be required when the UAV is within a relatively complex environment (e.g., in an indoor and/or closed space).

In some embodiments, selection of the navigation mode indicator 554 can cause additional controls to be displayed for configuring various parameters associated with a navigation mode. Such additional controls may be used to set maximum altitude, minimum altitude, maximum distance, and the like.

The display section 510 can also include an intelligent orientation control (IOC) indicator 556 for controlling the heading of the UAV. For example, the IOC indicator 556 can be used to toggle between a follow mode and a lock mode for the UAV. When the follow mode is selected, the UAV is configured to change its heading in order to follow or track the remote user and/or remote terminal. When the lock mode is selected, the UAV can be configured to fly according to a preset direction and/or predetermined flight path (e.g., circling around a point of interest or the home point).

The display section 510 can also include one or more storage indicators 558, 560 indicating a current data storage capacity of the payload and/or the UAV. The data storage capacity of the payload and/or the UAV can be expressed by a photo capacity indicator 558 and a video capacity indicator 560. The image capacity indicator 558 can include a photo icon along with a number of photos that can be stored using the currently available storage. The video capacity indicator 560 can include a video icon along with a length of videos (e.g., in hours, minutes and/or seconds) that can be stored using the currently available storage.

The display section 510 can also include a back control 562 that can be used to back out the current user interface and return to the interface for a previous menu control/item, similar to the functionality of a browser back button.

In various embodiments, more, less, or different controls can be displayed that may be different from the illustrated UI. For instance, the UI may be configured to show only the image display section without showing any information display sections; or vice versa. The information displayed in various sections of FIG. 1 can be mixed and matched in different sections in other embodiments. The information displayed in the UI can be represented by graphical icons or indicators or in textual or numeric format. Additionally, the information displayed can be dynamically changed automatically or in response to user input. As discussed above, at least some of the information sections 502, 504, 506, 508, 510, 512 may be dynamically hidden/collapsed, or shown/expanded. For instance, the display of the map section 504 may be toggled by the selection of the toggle control 503 (e.g., as an arrow icon). The toggle control 503 may be displayed in the interior or exterior of the associated content display area. In some embodiments, data displayed in one section can be dynamically switched to be displayed in another section. For example, in an embodiment, the map section 504 and the image section 501 can be swapped such that image section is displayed as an inset of the map section in a picture-in-picture fashion. In some embodiments, the layout of the sections of the UI may be dynamically changed to be different than that shown in FIG. 5. For instance, the sections may be shown in a tiled fashion or in one or more parallel panels.

Figure 6:
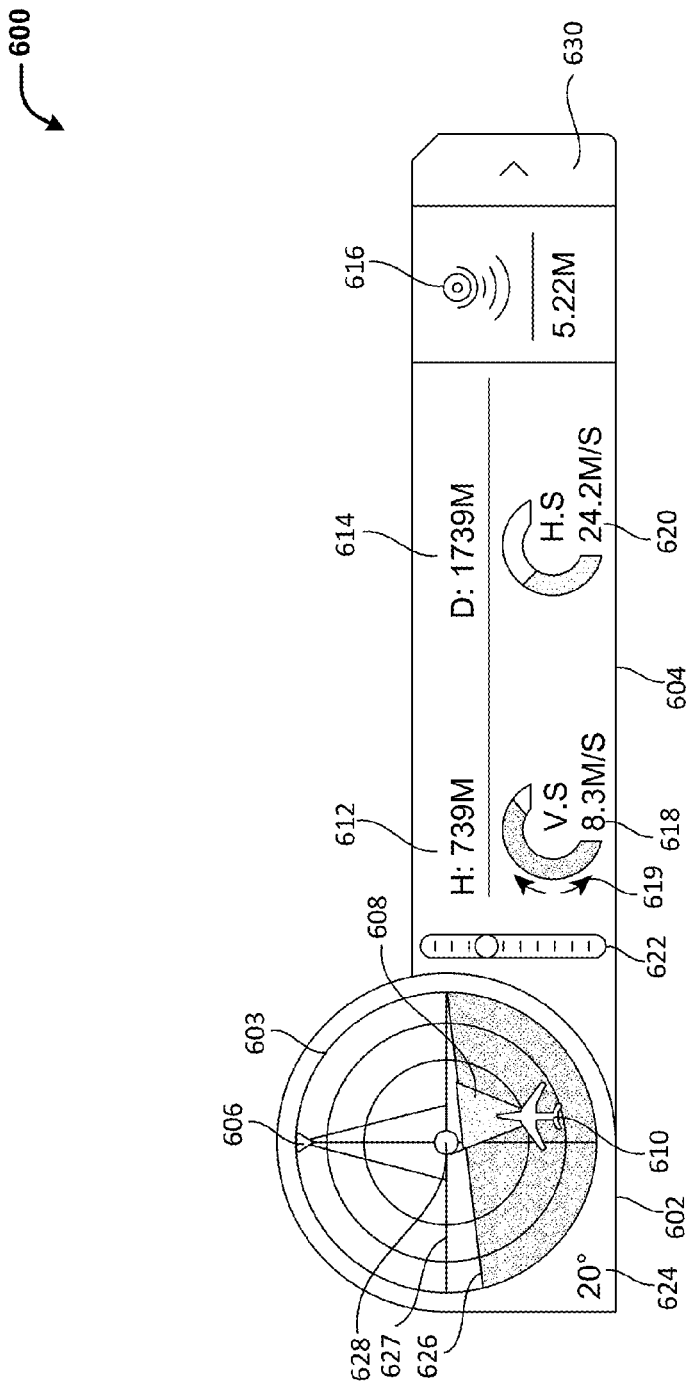
FIG. 6 illustrates an exemplary flight display section, in accordance with embodiments.

FIG. 6 illustrates an exemplary flight display section 600, in accordance with embodiments. The flight display section 600 can be similar to the flight display section 502 discussed in FIG. 5 but described here in more detail. The flight display section 600 can be used to display position, attitude, speed, and other flight information related to the UAV and/or a payload. Said flight information can be display within one or more display regions or sections within the flight display section 600.

The flight display section 600 can include an icon display section 602 and a flight parameters display section 604. The icon display section 602 can be used at least partially to display state information of the UAV, state information of the payload, state information of a remote terminal, or any combinations there. For instance, the flight display section 602 can be configured to simultaneously display both UAV state information and payload state information. The flight display section 602 can be configured to simultaneously display both UAV state information and remote terminal state information. The flight display section 602 can be configured to simultaneously display both UAV state information, payload state information, and remote terminal state information.

The icon display section 602 can comprise a substantially circular region 603 that is similar to a top-down radar map. The icon display section 602 can be used to illustrate the relative positions and bearings of the UAV and a remote terminal (e.g., remote control terminal and/or remote display terminal). The UAV can be represented by a UAV icon 610 and the remote terminal can be represented by a remote terminal icon 628.

In some embodiments, the remote terminal icon 628 is displayed at the center of the substantially circular region 603. The scale of the substantially circular region 603 can be represented by one or more concentric range rings that radiate from the center. The radii of the range rings can correspond to actual distance from the center such as 10 miles, 20 miles, 30 miles, and the like according to a predetermined ratio or scale. In some embodiments, the scale of the substantially circular region 603 can be dynamically adjusted to fit both the remote terminal and the UAV in the substantially circular region 603. For instance, when the distance increases between the UAV and the remote terminal, the number of range rings can increase; alternatively and/or additionally, the radii can be scaled up to represent longer distances. The opposite may be true when the distance between the UAV and the remote terminal decreases.

The orientation of the remote terminal 628 can be indicated by a remote terminal orientation indicator 606. The remote terminal orientation indicator 606 can be located on the periphery of the substantially circular region and moves correspondingly when the remote terminal turns, e.g., around a yaw axis. In an example, the direction of the orientation indicator can correspond to the direction a user operating the remote terminal is facing. In some embodiments, the orientation of the remote terminal may be measured by a magnetometer and/or GPS sensor associated with the remote terminal.

In some embodiments, the orientation of the UAV can be indicated by an orientation of the UAV icon 610 such as indicated by the pointing direction of the nose of UAV as shown by the UAV icon 610. The orientation of the UAV can include an orientation of the UAV around a yaw axis. The UAV indicator 610 can be associated with a field of view (FOV) indicator 608. The FOV of the UAV can correspond to the FOV of a payload carried by the UAV or the FOV of any visual or image sensor onboard the UAV. The FOV indicator 608 can be shown as a substantially cone shape projecting from the UAV. The relative yaw angle of the FOV (e.g., the angle between the midline of the cone and the heading of the UAV) can correspond to a yaw angle of the payload or a visual sensor relative to the yaw angle of the UAV. By default relative yaw angle of the FOV may be the same as the heading of the UAV and thus zero. In some cases, the carrier of the payload may cause a relative yaw angle between the pointing direction of the payload and the heading of the UAV.

In some embodiments, the angle of the cone shape (e.g., the angle between the two straight lines defining the cone) can correspond to an actual FOV of the payload. Alternatively, the angle of the cone shape may be an arbitrary angle that does not necessarily correspond to the actual FOV of the payload. In some embodiments, an angle of yaw/roll rotation of the carrier and/or payload can be displayed in numeric format by a yaw/roll angle indicator 624 in the icon display section 602.

The substantially circular region 603 can also function as a UAV attitude display that illustrate an orientation of the UAV, e.g., around a pitch axis and/or a roll axis. For example, a payload roll/pitch indicator 626 can comprise a line that extends between two points on the periphery of the substantially circular region 603. The tilting of the line 626 can be used to indicate a roll orientation of the UAV. For instance, a leveled or horizontal line 626 parallel to the horizon 627 can indicate zero roll rotation of the UAV. A counter clockwise tilt of the line 626 relative to the horizon 627 (i.e., the leftmost point of the line is lower than the rightmost end of the line) can indicate a corresponding counter clockwise roll of the UAV (from the UAV's perspective). Likewise, a clockwise tilt of the line 626 relative to the horizon 627 (i.e., the leftmost end of the line is higher than the rightmost end of the line) can indicate a corresponding clockwise roll of the UAV (from the UAV's perspective).

Additionally or alternatively, the rise and fall of the line 626 relative to the horizon 627 can be used to indicate a pitch orientation of the UAV. For instance, a horizontal line through the center of the substantially circular region can indicate a zero pitch rotation of the UAV relative to the horizon 627. A rise of the line 626 towards the top of the substantially circular region 603 can indicate an upward tilt around the pitch axis. A fall of the line 626 towards the bottom of the substantially circular region 603 can indicate a downward tilt around the pitch axis.

As discussed herein, in some embodiments, the payload can be allowed to move rotationally around one, two, or three axes of the relative to the UAV. The axes can include a pitch axis, a roll axis, a yaw axis, or any combinations thereof. As such, in some alternative embodiments, the substantially circular region 603 can also function as a payload attitude display that illustrate an orientation of the carrier and/or payload, e.g., around a pitch axis and/or a roll axis. For example, a payload roll/pitch indicator 626 can comprise a line that extends between two points on the periphery of the substantially circular region 603. The tilting of the line 626 can be used to indicate a roll orientation of the payload and/or carrier. For instance, a leveled or horizontal line 626 can indicate zero roll rotation of the payload relative to the UAV. A counter clockwise tilt of the line 626 (i.e., the leftmost point of the line is lower than the rightmost end of the line) can indicate a corresponding clockwise roll of the payload relative to the UAV. Likewise, a clockwise tilt of the line 626 (i.e., the leftmost end of the line is higher than the rightmost end of the line) can indicate a corresponding counter clockwise roll of the payload relative to the UAV.

Additionally or alternatively, the rise and fall of the line 626 can be used to indicate a pitch orientation of the payload and/or carrier. For instance, a horizontal line through the center of the substantially circular region can indicate a zero pitch rotation of the payload relative to the UAV. A rise of the line 626 towards the top of the substantially circular region 603 can indicate an upward tilt around the pitch axis. A fall of the line 626 towards the bottom of the substantially circular region 603 can indicate a downward tilt around the pitch axis.

As discussed above, in some embodiments, the yaw orientation of UAV can be illustrated by the orientation of the UAV icon 610. The pitch and roll orientation of the UAV can be illustrated by the level indicator 626 in the substantially circular region 603. The yaw and roll orientation of payload can be illustrated by the FOV indicator 608 and the roll angle indicator 624, respectively.

In some embodiments, the pitch orientation of the payload (or the line of sight thereof) can be illustrated by a payload pitch indicator 622 comprising a vertical scrollbar. The pitch indicator can be disposed in the icon display section 602. The up and down movements of the scrollbar can correspond to the up and down movements of the payload around a pitch axis. In some embodiments, the pitch indicator 622 can optionally include a direction indicator showing the direction of the pitch movement of the payload. In some embodiments, the pitch indicator 622 is always displayed. In some other embodiments, the pitch indicator 622 is not displayed by default but only displayed when there is a non-zero angle between the pitch orientation of the payload and the pitch orientation of the UAV. The direction indicator can comprise an up control and/or a down control that may become activated (e.g., via change in color, shape, or other characteristics) when the pitch angle reaches or exceeds a certain predetermined range.

In some embodiments, the orientation indicators described above are configured to only display information. Additional controls are required to control or otherwise change an orientation (e.g., pitch/yaw/roll). In some other embodiments, the orientation indicators described above are configured to both display information and receive user input to control the respective orientations of the UAV and/or payload.

The flight parameters display section 604 can be used to display flight parameters of the UAV such as distances and speeds. The flight parameters display section 604 can be displayed adjacent to or separate from the icon display section 602. As illustrated, the flight parameters display section 604 can include a vertical distance indicator 612 and a horizontal distance indicator 614 used to show the vertical distance and the horizontal distance, respectively, between the UAV and a predetermined reference point such as a home point, a remote control terminal and/or the remote display terminal, or any other reference point or location. The vertical distance indicator 612 and the horizontal distance indicator 614 can each include a symbol or icon illustrative of the parameter being represented (e.g., "H" for height or vertical distance and "D" for horizontal distance) along with a numeric value of the parameter (e.g., "739 m" for 739 meters in vertical distance and "1739 m" for 1739 meters in horizontal distance).

The flight parameters display section 604 can include a vertical speed indicator 618 and a horizontal speed indicator 620 used to show the vertical speed and horizontal speed, respectively, of the UAV relative to a predetermined frame of reference (e.g., relative to the ground, the wind, the remote controller, or other objects). For instance, the displayed speeds can include a vertical speed, a groundspeed, or an airspeed. In some embodiments, the vertical speed indicator 618 and the horizontal speed indicator 620 can each include an arch scale representing the magnitude of the represented speed along with a numeric value of the speed value (e.g., "8.3 m/s" for vertical speed and "24.2 m/s" for horizontal speed). Additionally, the vertical speed indicator 618 can also include a direction indicator 619 indicative of the direction of the vertical movement of the UAV. For example, the direction indicator 619 can include an up arrow and a down arrow. The up arrow can highlighted or otherwise displayed as active when the UAV is moving upward. Likewise, the down arrow can highlighted or otherwise displayed as active when the UAV is moving downward.

The flight parameters display section 604 can also include a proximity indicator 616 used to indicate proximity of the UAV to a reference object. The reference object can include an object in the surrounding of the UAV such as on or near the flight path of the UAV. For example, proximity indicator 616 can be used to indicate proximity to obstacles surrounding the UAV. The proximity may be measured from the UAV to a surface of the object such as any surface of a building, a ground, a tree, or the like. The obstacle may or may not be located within a predetermined range from the UAV. The predetermined range may be determined by a maximum and/or minimum detection range of a proximity sensor that is used to detect the obstacle. Examples of the proximity sensor may include a lidar sensor, an ultrasound sensor, an infrared sensor, a visual sensor, and the like. In some embodiments, the reference point can also include a location of the remote control terminal and/or the display terminal, a home point for the UAV to return, or any other waypoint. In some embodiments, the proximity indicator 616 can include a proximity icon along with a numeric representation of the proximity from the UAV to the reference point (e.g., "5.2 m"). In some embodiments, more than one proximity indicators may be provided to indicate proximity to more than one reference points.

In some embodiments, a warning may be provided if the proximity between the UAV and the reference point is outside a predetermined range. For example, the warning may be given if the UAV is within a predetermined minimum distance from an object, thereby indicating an imminent collision with an object. As such, the warning and the proximity indicator 616 may allow a user operating the UAV to avoid such obstacles in a timely manner. As another example, the warning may be given if the UAV is farther than a predetermined distance from an object. The object may include a target object that the user intends to track. The object may include a remote controller with a limited control range. As such, the warning and the proximity indicator 616 may allow the user to maneuver the UAV to come back closer to the object, for example, to prevent loss of control of the UAV.

In various embodiments, the warning can include a visual signal, an audio signal, a tactile feedback, or any combination thereof. The warning signals may be provided via the remote display terminal, remote control terminal, the UAV, or some other devices. For example, a visual warning may be represented visually by a red or flashing proximity indicator 616 or some other visual indicators on the display terminal. Additionally or alternatively, an audio warning may be provided that may include a beeping sound, an alarm sound, a piece of music, a human voice, or any combination thereof. Additionally or alternatively, a tactile feedback may be provided that may include a vibration, an application of force, or a movement that can be felt by a user operating the remote display terminal and/or the remote control terminal. For example, the tactile feedback may be represented by a vibration of remote display terminal and/or the remote control terminal.

In some embodiments, at least some of the icons or controls displayed in the flight display section 500 may be selectable by a user. The selection of such selectable controls may cause further information to be displayed in addition to or instead of the currently displayed information. For example, selection of the control 630 may cause additional controls to be displayed for controlling settings associated with the payload such as for controlling a film speed, shutter speed, exposure compensation, and the like. As another example, selection of the UAV icon 610 can cause the display of a three-dimensional depiction of the UAV's spatial disposition relative to a remote terminal (e.g., remote control terminal and/or remote display terminal). The depiction may include an orientation of the UAV around the pitch, yaw, and roll axis as perceived by a remote terminal or according to some other point of reference.

In some embodiments, at least some aspects of the flight display section 600 can be customized by a user. For example, a user may change, via the user interface, the perspective or the frame of reference associated with the display section 602. Instead of a top-down view showing both the remote terminal and the UAV, the icon display section may be configured show only the relative spatial disposition of the UAV as perceived by the remote terminal. As another example, a user can change the units and/or precision of values shown in the flight parameters display section 604 such as speed and distance.

Figure 7:
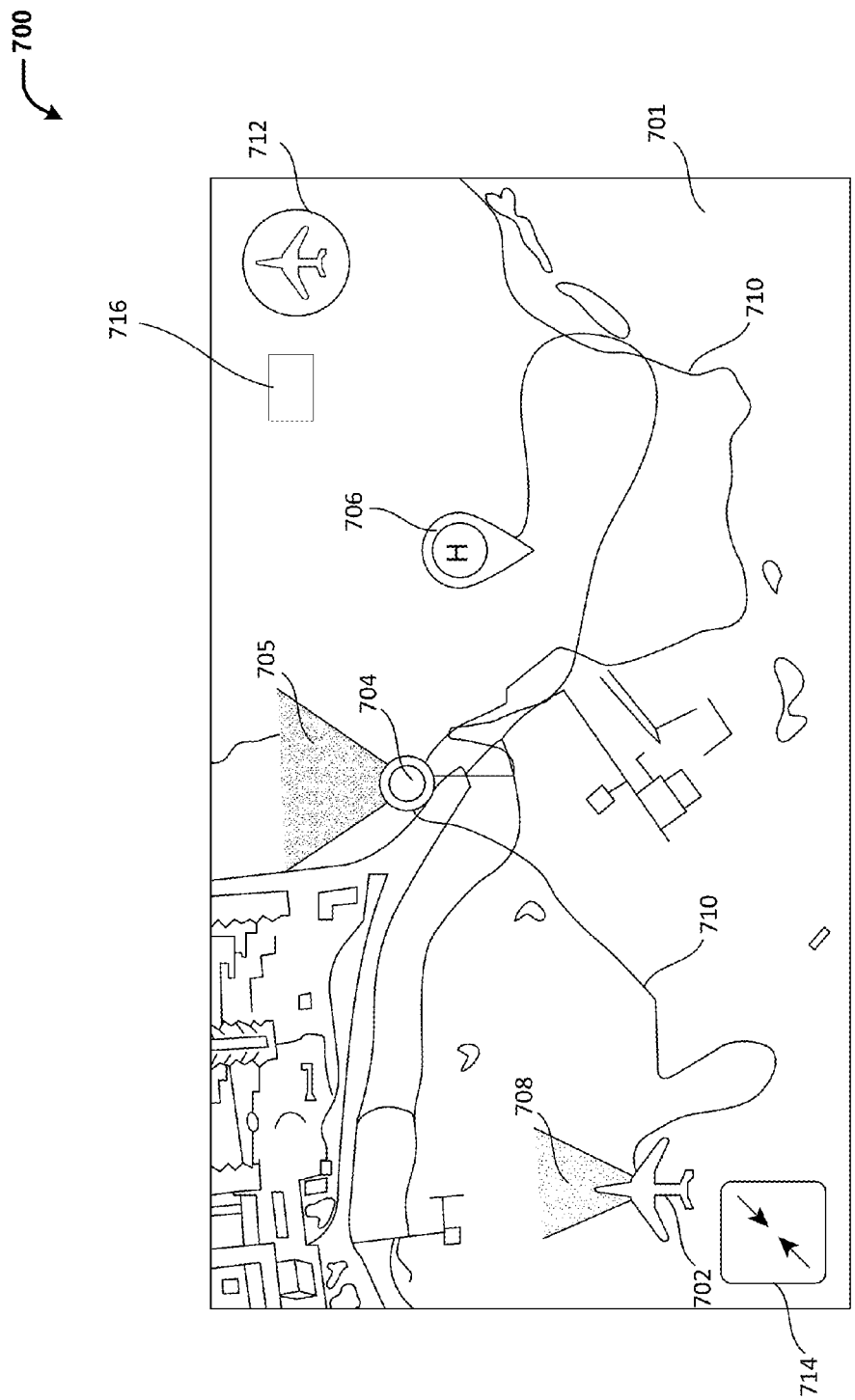
FIG. 7 illustrates an exemplary map section, in accordance with embodiments.

FIG. 7 illustrates an exemplary map section 700, in accordance with embodiments. The map section 700 can be similar to the map section 504 discussed in FIG. 5 but described here in more detail. The map section 700 can be used to display the current positions the UAV, the remote terminal (e.g., remote control terminal and/or remote display terminal), and/or a reference point such as a home point. The map section 700 can also be used to display FOV of the UAV and/or a flight path of the UAV.

The map section 700 can include a UAV icon 702, a remote terminal indicator 704, and a reference point indicator 706, all positioned on a map 701. The reference point indicated by the reference point indicator 706 may include a home point or some other suitable point. The map 701 can include geographical features of a region such as land, water, forest, roads, buildings, and the like. The map 701 can be generated based on satellite images, GPS data, geological surveys, and the like. In some embodiments, the data used to generate the map 701 may be obtained from a local or remote data store, servers, cloud-based services, satellites, and the like. The map can correspond to an actual geographic region according to some predetermined ratio or scale. The positions of the UAV icon 702, the remote terminal indicator 704, and the reference point indicator 706 on the map 701 can correspond proportionately to their respective positions in the geographic region according to the scale of the map. In some embodiments, the map may be scaled so as to display all of the UAV, remote terminal, reference point, or any other objects of interest. In other embodiments, the map only displays a subset of the objects of interests above.

The UAV icon 702 may be used to indicate a position of the UAV on the map and/or an orientation of the UAV. The orientation of the UAV may be indicated by the pointing direction of the nose of UAV as shown by the UAV icon 702. The orientation of the UAV that is displayed can correspond to a heading or a yaw orientation of the UAV. The field of view (FOV) indicator 708 can be provided to indicate a field of view (FOV) of the UAV. The FOV of the UAV can correspond to the FOV of a payload carried by the UAV or the FOV of any visual or image sensor onboard the UAV. The FOV indicator 708 can be shown as a substantially cone shape projecting from the UAV similar to the FOV indicator 608 described in FIG. 6. The pointing direction of the cone can correspond to a yaw angle or orientation of the payload or any other suitable visual sensor. The yaw angle of the payload or any other visual sensor may be the same as the UAV. In some embodiments, the carrier that couples the payload to the UAV may permit the payload to move rotationally around a yaw axis relative to the UAV. In such cases, the yaw orientation of the payload may be different from the yaw orientation of the UAV. In some embodiments, the angle of the cone shape can correspond to an actual FOV of the payload. Alternatively, the angle of the cone shape may be an arbitrary angle that does not necessarily correspond to the actual FOV of the payload. Advantageously, the FOV indicator 708 allows a user to see the direction and/or angle range of the FOV of the UAV as projected onto a map, thereby easily understanding the approximate range of landscape that can be captured by the payload or visual sensor.

The orientation of the remote terminal indicator 704 can be shown with an orientation indicator 705. The orientation indicator 705 can be substantially cone-shaped. The direction of projection of the cone shape can correspond to the direction a user operating the remote terminal is facing. The direction as indicated by the orientation indicator 705 can change in correspondence with a change in orientation of the remote terminal.

The map section 700 can also include a flight path indicator 710. The flight path indicator 710 can represent a flight path of the UAV. In some embodiments, data required for generating the flight path can be received from the UAV. The data can include position information (e.g., GPS coordinates) of a series of waypoints along the flight path. In some embodiments, a user can customize the flight path that is being displayed by specifying the start location/time, end location/time, duration of the flight path, and other parameters.

The map section 700 can also include an eraser control 716. The eraser control 716 can be used to remove some or all portions of the flight path displayed by the flight path indicator 710. In an embodiment, selection of the eraser control 716 causes the all the flight path so far to be erased from the map display. In another embodiment, a user can select the eraser control 716 and uses it to erase a portion of the flight path being displayed. In some embodiments, additional flight path after the erasure may still be recorded and/or displayed. In other embodiments, the eraser control 716 can be used to turn off/on the recording and/or display of the flight path.

The map section 700 can also include a reference control 712 used to select from a plurality of display modes with varying frames of reference. For example, the reference frame under a first display mode may be the UAV. As such, the heading of the UAV is displayed as fixed (e.g., nose of the UAV pointing upward). Non-UAV objects in the map (e.g., remote terminal, reference points, geographical objects) are shown as relative to the fixed UAV heading and change their orientations when the heading of the UAV changes. The reference frame under a second display mode may be the remote terminal. As such, the heading of the remote terminal is fixed and the non-remote-terminal objects in the map (e.g., UAV, buildings, geographical objects) are shown as relative to the fixed heading of the remote terminal and change their orientations when the heading of the remote terminal changes. The reference frame under a third display mode may be the earth. As such, the geographical objects such as buildings in the map have a fixed orientation (e.g., north, south, west and east). When heading of the UAV or the remote terminal change, the corresponding changes are represented in the map. In some embodiments, reference control 712 can be represented by different icons to visually indicate the current selected display mode and/or the next available display mode. For example, an icon of an aircraft may be displayed when the first mode is selected. An icon of a remote terminal may be displayed when the second mode is selected. An icon of a compass may be displayed when the third mode is selected.

The map section 700 can also include a scale control 714. The scale control 714 can be used to select a display mode from a plurality of display modes with varying scales. For instance, the scale control 714 may allow a user to select or toggle between a first display mode and a second display mode. Under the first display mode, a scale of the map may be increased automatically (e.g., from 1:1,000,000 to 1:5,000,000) so as to display all points of interest such the UAV, the remote terminal and the reference point. The map under the first mode allows a user to easily see a global relationship among all points of interest. Under the second display mode, the map may be scaled down automatically to display only a subset of the points of interest. For example, map under the second display mode may only display a portion of the map under the first display mode. For instance, the map under the second mode allows a user to focus only on the region surrounding the UAV. In some other embodiments, the scale control 714 may be configured to allow a user to switch among three, four, or more different display mode. For instance, the map under the third mode may have a scale that is between the map scale under the first mode and the map scale under the second mode. The map under the third mode may, in an example, be used to display more points of interest than the first mode but less points of interest than the third mode. In some embodiments, scale control 714 can be represented by different icons to visually indicate the current selected display mode and/or the next available display mode. For example, a zoom-in icon may be displayed when the current display mode has a large map scale whereas a zoom-out icon may be displayed when current display mode has a small map scale. Advantageously, the scale control 714 enables a user to easily switch (e.g., via a one-button click) between the different viewing modes without taking up further display area.

In some embodiments, at least some aspects of the map section 700 can be customized by a user. For example, a user may specify the points of interest to be displayed on the map. The points of interest may include only the UAV and the remote terminal, only the UAV and the reference point, or the like. In some embodiments, the user may add more points of interest than illustrated. For instance, the user may add one, two, three, or more reference points to be shown on the map by clicking on the map. In some embodiments, the user can add or remove information that is displayed on the map. For example, the user may be allowed to activate or deactivate the FOV indicator 708 and/or the remote terminal orientation indicator 705. In other embodiments, the user may be allowed to zoom in on a particular portion of the map, zoom out, toggle between satellite and street view, or perform other functionalities.

The systems and methods described herein can be implemented by and/or applied to a wide variety of movable objects. The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include primates, avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 cm, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 cm, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 8:
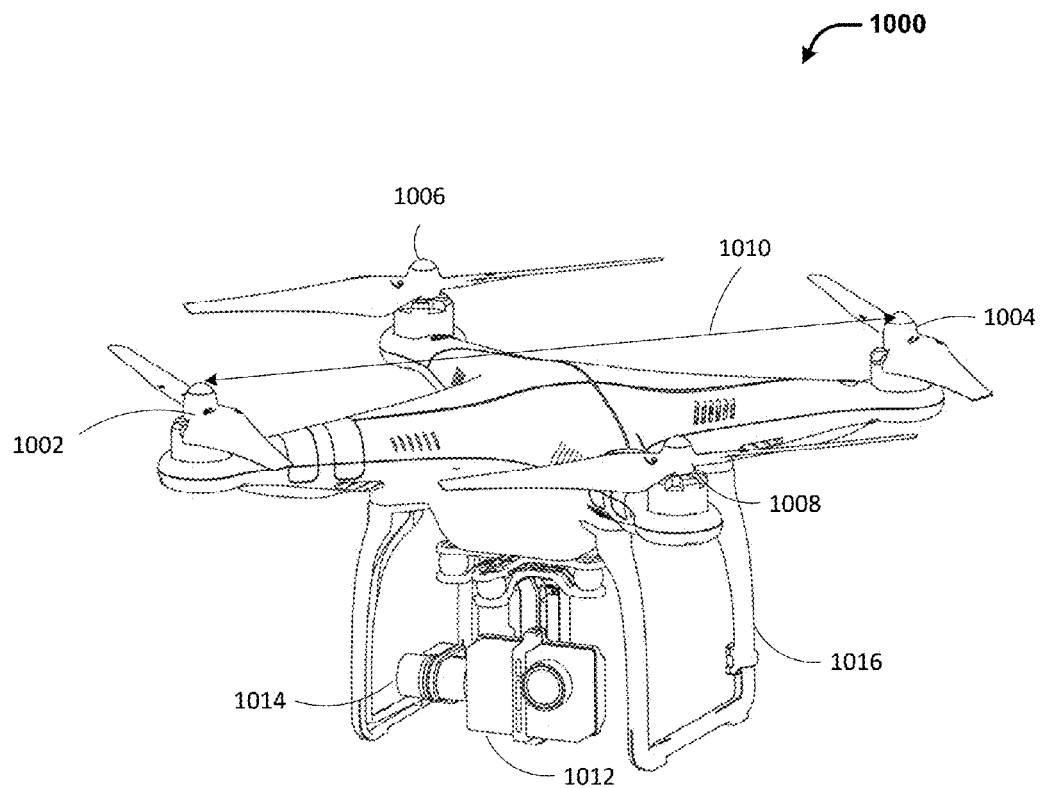
FIG. 8 illustrates a UAV, in accordance with embodiments of the present invention.

FIG. 8 illustrates a UAV 1000, in accordance with embodiments of the present invention. The UAV may be an example of a movable object as described herein. The UAV 1000 can include a propulsion system having four rotors 1002, 1004, 1006, and 1008. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 2 m, or less than equal to 5 m. In some embodiments, the length 1010 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be the same housing of the movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload 1012. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier 1014. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the position of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 9:
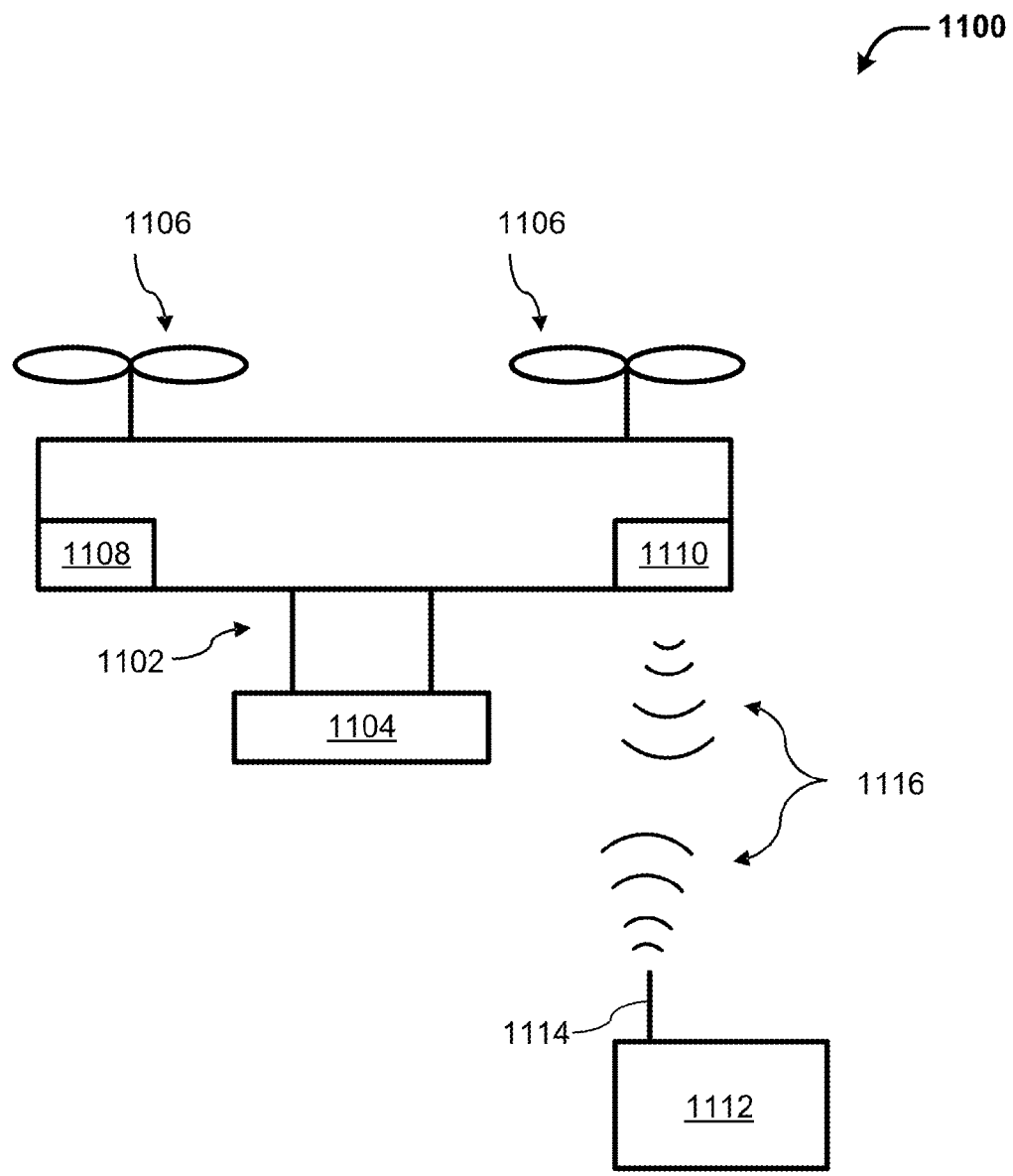
FIG. 9 illustrates a movable object including a carrier and a payload, in accordance with embodiments.

FIG. 9 illustrates a movable object 1100 including a carrier 1102 and a payload 1104, in accordance with embodiments. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 1104 may be provided on the movable object 1100 without requiring the carrier 1102. The movable object 1100 may include propulsion mechanisms 1106, a sensing system 1108, and a communication system 1110.

The propulsion mechanisms 1106 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanism 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication.

The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera; and data generated from image data captured by the payload camera). In some instances, control data from the terminal may include instructions for relative positions, movements, actuations, or controls of the movable object, carrier, and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the movable object, carrier and/or payload may include information from one or more sensors (e.g., of the sensing system 1108 or of the payload 1104) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload. The control data transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

Figure 10:
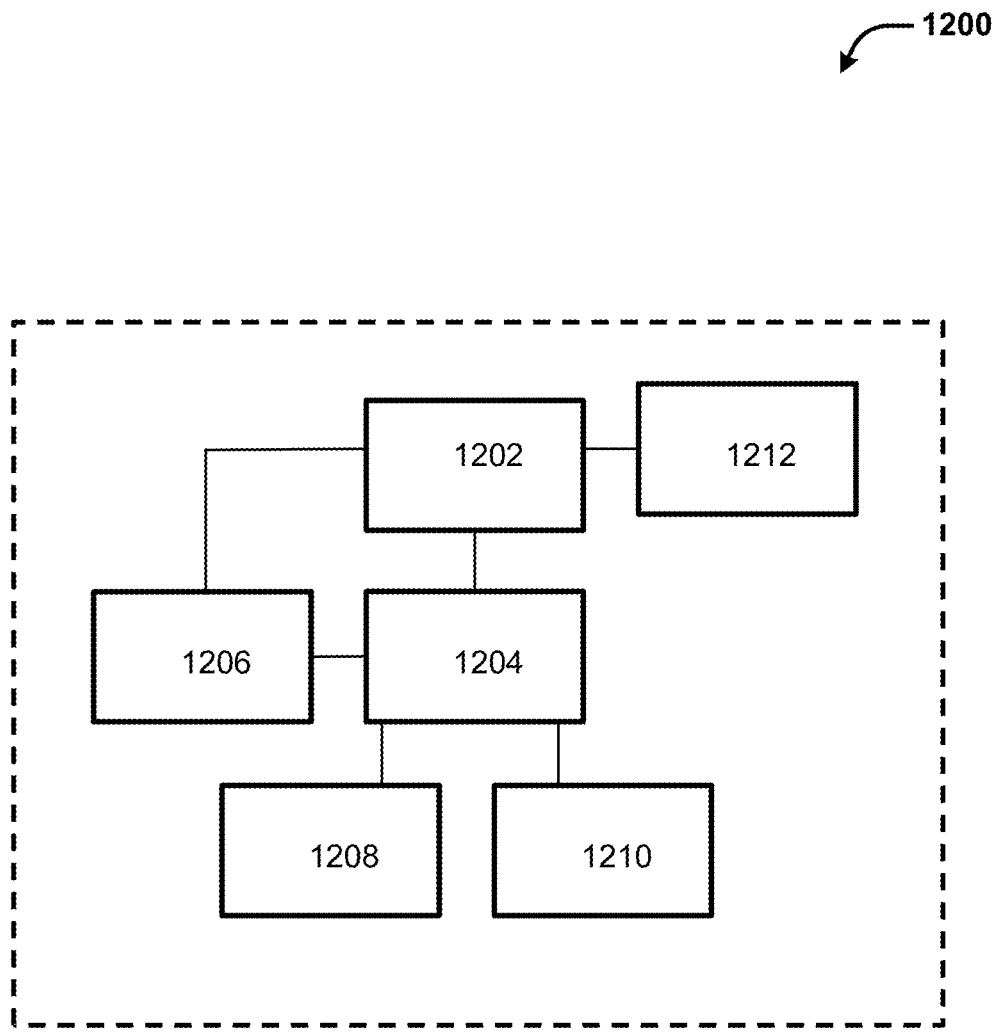
FIG. 10 illustrates an exemplary system for controlling a UAV, in accordance with embodiments.

FIG. 10 illustrates an exemplary system 1200 for controlling a UAV, in accordance with embodiments. The system 1200 can be used in combination with any suitable embodiment of the systems, devices, and methods disclosed herein. For example, the system 1200 may be implemented or carried by a movable object. The system 1200 can include a sensing module 1202, processing unit 1204, non-transitory computer readable medium 1206, control module 1208, and communication module 1210.

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1202 can be operatively coupled to a processing unit 1204 having a plurality of processors. In some embodiments, the sensing module can be operatively coupled to a transmission module 1212 (e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable processor (e.g., a central processing unit (CPU)). For example, the processing unit 1204 may include a field programmable gate array (FPGA) and/or one or more ARM processors. The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. For example, the processing unit 1204 can be configured to execute instructions causing one or more processors of the processing unit 1204 to perform one or more processes discussed herein. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. For example, the control module 1208 can be configured to cause a UAV to maintain a hover position. Alternatively or in combination, the control module 1208 can control one or more of a state of a carrier, payload, or sensing module. For example, the control module 1208 can be used to control the carrier so as to rotate the payload (e.g., an image capturing device) around a first axis (e.g., Y or yaw) while maintaining a predetermined disposition (e.g., leveled position). The control module 1208 can also be used to control the payload to capture a plurality of images at predetermined intervals while the payload is being rotated.

The processing unit 1204 can be operatively coupled to a communication module 1210 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, and/or processing results produced by the processing unit 1204, predetermined control data or user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 10 depicts a single processing unit 1204, a single non-transitory computer readable medium 1206, and a single control module 1208, one of skill in the art would appreciate that this is not intended to be limiting, and that the system 1200 can include a plurality of processing units, control modules, and/or non-transitory computer readable media. In some embodiments, one or more of the plurality of processing units, control modules, and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations.

Figure 11:
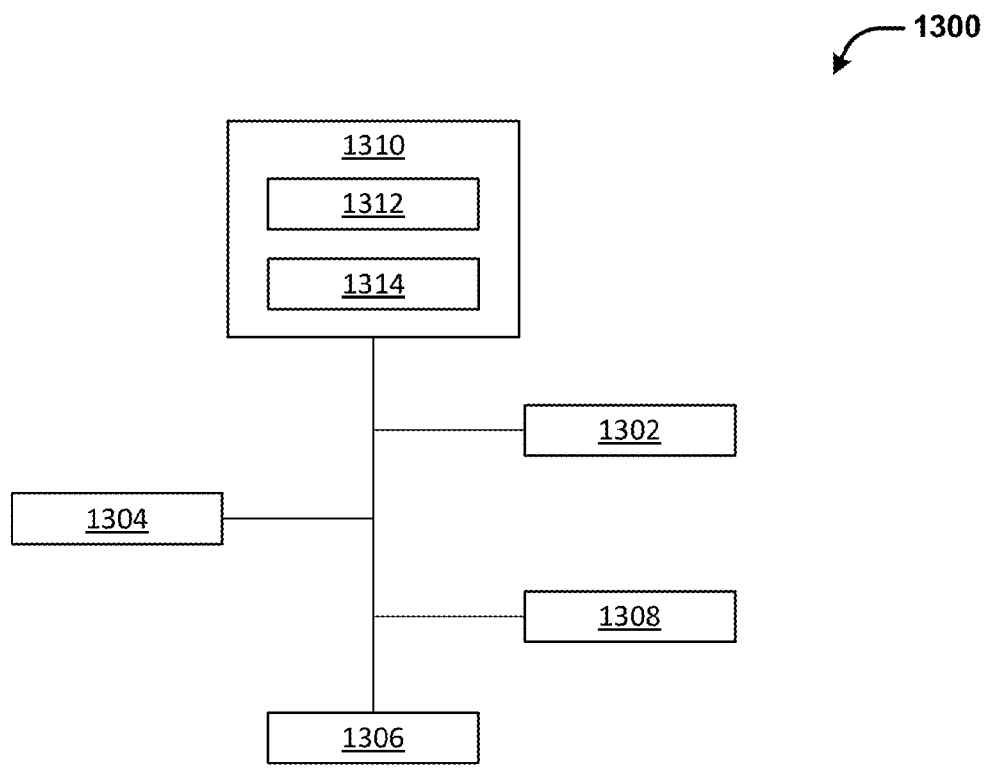
FIG. 11 illustrates an exemplary system implemented by a remote terminal, in accordance with embodiments.

FIG. 11 illustrates an exemplary system 1300 implemented by a remote terminal, in accordance with embodiments. The system 1300 can be used to control a movable object such as a UAV and/or for displaying information related to the UAV. The remote terminal can be a remote control terminal, a remote display terminal, or a terminal that combines the functionality of both. The system 1300 can be used in combination with any suitable embodiment of the systems, devices, and methods disclosed herein. The system 1300 can include an input module 1302, a processing unit 1304, a non-transitory computer readable medium 1306, a display module 1308, and a communication module 1310, all interconnected via a bus or a similar network.

The input module 1302 can include one or more input mechanisms for receiving input from a user operating the input module. Such input mechanisms can include one or more joysticks, switches, knobs, slide switches, buttons, dials, touchscreens, keypads, keyboard, mouse, voice controls, gesture controls, inertial sensors, and the like. Such input module 1302 can be used to receive user input used to control aspects of the movable object, carrier, payload, or a component thereof. Such aspects may include attitude, position, orientation, navigation, tracking, and the like. For example, the input mechanisms can be manually set by a user to one or more positions, each of the positions corresponding to a predetermined input for controlling the UAV.

In some embodiments, the input mechanisms can be manipulated by a user to input control commands for controlling the navigation of the movable object. For instance, the user may utilize a knob, switch, or a similar input mechanism to input a flight mode for the movable object such as auto pilot or navigation according to a predetermined navigation path. As another example, the user may control the position, attitude, orientation and other aspect of the movable object by the tilting the control terminal in certain ways, which may be detected by one or more inertial sensors and used to generate the corresponding navigation commands. As yet another example, the user may use the input mechanism to adjust an operational parameter (e.g., zoom) of the payload, an attitude and/or the payload (e.g., via the carrier), or other aspects of any object onboard the movable object.

The processing unit 1304 can have one or more processors, such as a programmable processor (e.g., a central processing unit (CPU) or a microcontroller). The processing unit 1304 can be operatively coupled to a memory 1306. The memory 1306 can include transitory and/or non-transitory storage media configured to store data, and/or logic, code, and/or program instructions executable by the processing unit 1304 for performing one or more routines or functions. The memory can include one or more memory units (e.g., removable media or external storage such as an SD card or random access memory (RAM)). In some embodiments, data from the input module 1302 can be directly conveyed to and stored within the memory units of the memory 1306. The memory units of the memory 1306 can store logic, code and/or program instructions executable by the processing unit 1304 to perform any suitable embodiment of the methods described herein. For example, the processing unit 1304 can be configured to execute instructions causing one or more processors of the processing unit 1304 to perform one or more processes described herein. The memory units can store sensing data or other data received from external devices (e.g., movable object). In some embodiments, the memory units of the memory 1306 can be used to store the processing results produced by the processing unit 1304. Although FIG. 11 depicts a single processing unit 1304 and a single memory 1306, one of skill in the art would appreciate that this is not intended to be limiting, and that the system 1300 can include a plurality of processing units and/or memory units of the memory.

In some embodiments, the display module 1308 can be configured to display information of the movable object, carrier, and/or payload with respect to position, translational velocity, translational acceleration, orientation, angular velocity, angular acceleration, or any suitable combinations thereof. The display module 1308 can be configured to display information received from the movable object and/or payload such as sensing data (e.g., images recorded by a camera or other image capturing device), processed data such as stitched images generated by processors onboard the movable object, intermediate data generated during the image stitching process, control feedback data, and the like. In some embodiments, the display module 1308 may be implemented by the same device that implements the input module 1302. In other embodiments, the display module 1308 may be implemented by a device that is separate from (but that may be operatively coupled to) the device that implements the input module 1302.

The communication module 1310 can be configured to transmit and/or receive data from one or more external devices (e.g., movable object, payload, base station, remote controller, and the like). For example, the communication module 1310 can be configured to transmit control data (e.g., navigation commands, control commands) to external systems or devices such as movable objects, carriers, and/or payloads. The communication module 1310 can also be configured to receive data (e.g., sensing data and image stitching data) from external systems or devices. In some embodiments, the communication module 1310 can include a transmitter 1312 and a receiver 1314 respectively configured to transmit and receive data to and from remote devices. In some embodiments, the communication module can include a transceiver that combines the functionalities of the transmitter and the receiver. In some embodiments, the transmitter and the receiver can communicate with each other as well as with the processing unit 1304. Any suitable means of communication can be used, such as wired communication or wireless communication described herein.

Figure 12:
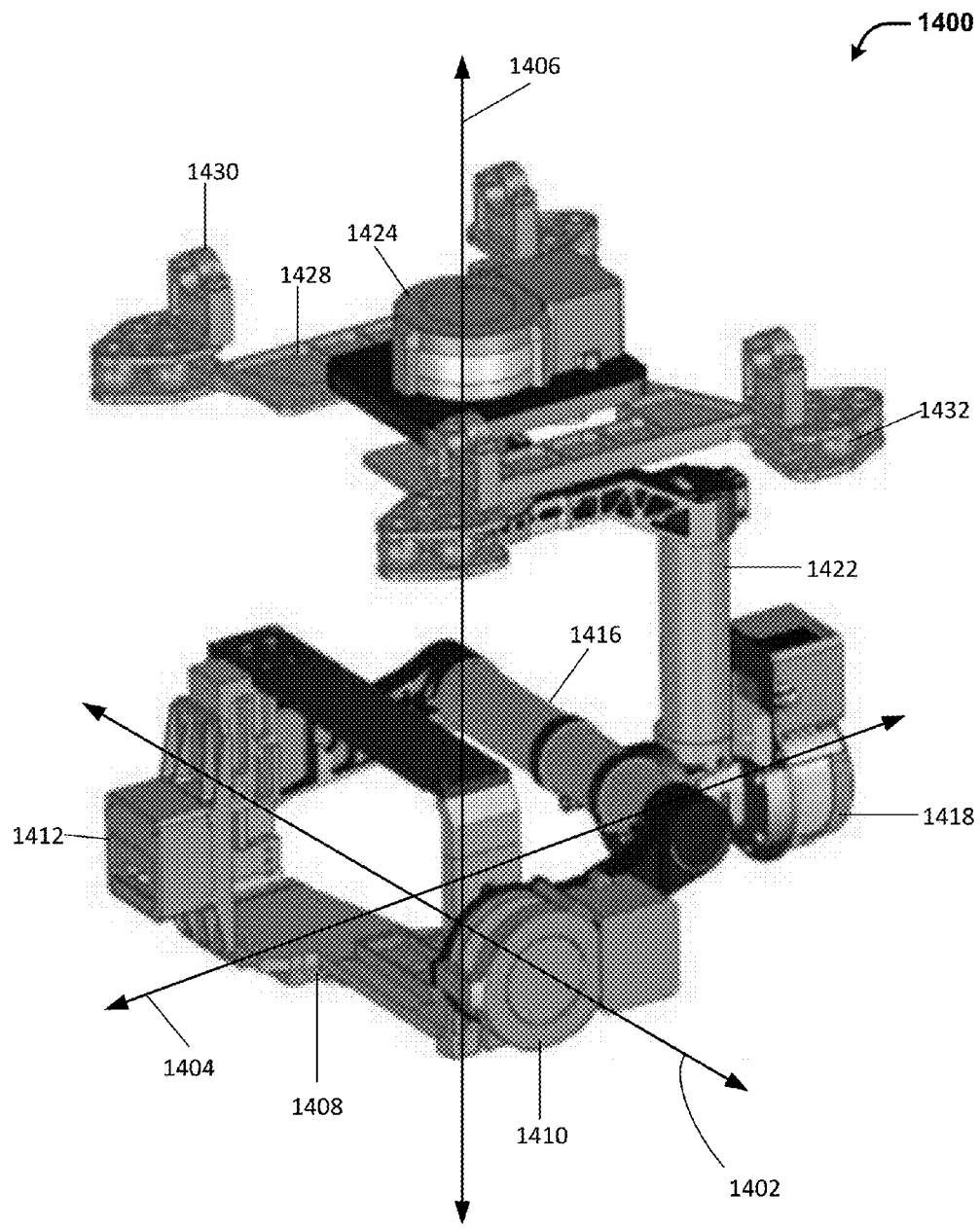
FIG. 12 illustrates an isometric view of an exemplary carrier, in accordance with embodiments.

FIG. 12 illustrates an isometric view of an exemplary carrier 1400, in accordance with embodiments. The carrier 1400 can be used to couple a payload such as an image capturing device to a movable object such as a UAV.

The carrier 1400 can be configured to permit the payload to rotate around up to three axes: X or pitch axis 1402, Z or roll axis 1404, and Y or yaw axis 1406 relative to the movable object. For instance, the carrier 1400 may be configured to permit the payload to rotate only around one, two, or all three of the axes. The three axes may or may not be orthogonal to each other. The range of rotation around any of the axes may or may not be limited and may vary for each of the axes. For instance, the maximum rotation allowed around the axes can be any suitable number of degrees such as 30 degrees, 60 degrees, 90 degrees, 120 degrees, 150 degrees, 180 degrees, 210 degrees, 240 degrees, 270 degrees, 300 degrees, 330 degrees, 360 degrees, 450 degrees, 540 degrees, 630 degrees, 720 degrees, and the like. The axes of rotation may or may not intersect with one another. For example, three orthogonal axes may intersect with one another. They may or may not intersect at a payload. Alternatively, they may not intersect.

The carrier 1400 can include a frame assembly comprising a first frame member 1408, a second frame member 1416, a third frame member 1422, and a fourth frame member 1428. The first frame member 1408 can be configured to be coupled with and support the payload (e.g., image capturing device). The first member 1408 may be rotationally coupled to the second frame member 1416 around the rotation axis 1402. The rotation axis 1402 can be substantially parallel to a pitch axis of the movable object (e.g., UAV) and/or the image capturing device. A first actuator member 1410 can be coupled to the first frame member 1408 and/or the second frame member 1416 so that the rotation axis of the first actuator member 1410 substantially coincides with the rotation axis 1402. The first actuator member 1410 can be configured to directly drive the first frame member 1408 and/or the second frame member 1416 so as to cause relative rotation therebetween around the rotation axis 1402. For instance, the first actuator member 1410 may include a direct-drive electric motor. In some embodiments, the rotor of the motor may be coupled to the first frame member 1408 while the stator of the motor may be coupled to the second frame member 1416. Alternatively, the stator of the motor may be coupled to the first frame member 1408 while the rotor of the motor may be coupled to the second frame member 1416.

Similarly, the second frame member 1416 can be rotationally coupled to the third frame member 1422 around the rotation axis 1404. The rotation axis 1404 can be substantially parallel to a roll axis of the movable object (e.g., UAV) and/or the image capturing device. The axis 1404 can be orthogonal to the axis 1402. Alternatively, the axis 1404 may not be orthogonal to the axis 1402. A second actuator member 1418 can be coupled to the second frame member 1416 and/or the third frame member 1422 so that the rotation axis of the second actuator member 1418 substantially coincides with the rotation axis 1404. The second actuator member 1418 can be configured to directly drive the second frame member 1416 and/or the third frame member 1422 so as to cause relative rotation therebetween around the rotation axis 1404. For instance, the second actuator member 1418 may include a direct-drive electric motor. In some embodiments, the rotor of the motor may be coupled to the second frame member 1416 while the stator of the motor may be coupled to the third frame member 1422. Alternatively, the stator of the motor may be coupled to the second frame member 1416 while the rotor of the motor may be coupled to the third frame member 1422.

Similarly, the third frame member 1422 can be rotationally coupled to the fourth frame member 1428 around the rotation axis 1406. The rotation axis 1406 can be substantially parallel to a yaw axis of the movable object (e.g., UAV) and/or the image capturing device. The axis 1406 can be orthogonal to the axis 1404. Alternatively, the axis 1406 may not be orthogonal to the axis 1404. A third actuator member 1424 can be coupled to the third frame member 1422 and/or the fourth frame member 1428 so that the rotation axis of the third actuator member 1424 substantially coincides with the rotation axis 1406. The third actuator member 1424 can be configured to directly drive the third frame member 1422 so as to cause the third frame member 1422 to rotate around the axis 1406 relative to the fourth frame member 1428. For instance, the third actuator member 1424 may include a direct-drive electric motor. In some embodiments, the rotor of the motor may be coupled to the third frame member 1422 while the stator of the motor may be coupled to the fourth frame member 1428. Alternatively, the stator of the motor may be coupled to the third frame member 1422 while the rotor of the motor may be coupled to the fourth frame member 1428.

The fourth frame member 1428 may be configured to be coupled with a movable object such as a UAV. The fourth frame member 1428 can include one, two, three, or more coupling members 1430 that are configured to directly engage with the movable object so as to facilitate the coupling of the fourth frame member 1428 and the movable object. In an alternative embodiment, the fourth frame member 1428 may be part of a movable object instead of being a part of the carrier. Alternatively, the fourth frame member 1428 may be held by a human, for example, to facilitate dynamic videography or photography.

In various embodiments, the actuators members 1410, 1418, and 1424 of the carrier can include any suitable direct-drive motors without power reduction (such as via mechanical gearbox). Advantageously, such direct-drive motors can provide improved efficiency (e.g., by reducing power loss in friction of mechanical gears), longer lifetime, faster response time, and more precise control compared with traditional non-direct-drive mechanisms.

In some embodiments, the carrier comprises one or more carrier sensors useful for determining a state of the carrier or the payload carried by the carrier. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload. In some embodiments, the state information as acquired or calculated from the sensor data may be used as feedback data to control the rotation of the components (e.g., frame members) of the carrier. Examples of such carrier sensors may include motion sensors (e.g., accelerometers), rotation sensors (e.g., gyroscope), inertial sensors, and the like.

The carrier sensors may be coupled to any suitable portion or portions of the carrier (e.g., frame members and/or actuator members) and may or may not be movable relative to the UAV. Additionally or alternatively, at least some of the carrier sensors may be coupled directly to the payload carried by the carrier. For example, the first frame member 1408 may be coupled with a sensor 1412. In cases where the first frame member 1408 rigidly coupled to the payload, the movement or motion experienced by the sensor 1412 can be substantially identical to that experienced by the payload. As such, the sensor 1412 can be used to measure posture information of the payload. In some embodiments, the sensor 1412 may be coupled directly the payload rather than to the first frame member 1408. Zero, one, or more sensors may be affixed to the first frame member, the second frame member, the third frame member, and/or the fourth frame member.

The carrier sensors may be coupled with some or all of the actuator members of the carrier. For example, three carrier sensors can be respectively coupled to the actuator members 1410, 1418, and 1424 of the carrier and configured to measure the driving of the respective actuator members 1410, 1418, and 1424. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator, thereby generating a position signal representative thereof. In an embodiment, each actuator-coupled sensor is configured to provide a positional signal for the corresponding actuator member that it measures. For example, a first potentiometer can be used to generate a first position signal for the first actuator member 1410, a second potentiometer can be used to generate a second position signal for the second actuator member 1418, and a third potentiometer can be used to generate a third position signal for the third actuator member 1424. In some embodiments, carrier sensors may also be coupled to some or all of the frame members of the carrier. The sensors may be able to convey information about the position and/or orientation of one, two, three, four or more frame members of the carrier and/or the image capturing device. The sensor data may be used to determine position and/or orientation of the image capturing device relative to the movable object and/or a reference frame.

The carrier sensors can provide position and/or orientation data that may be transmitted to one or more controllers (not shown) on the carrier or movable object. The sensor data can be used in a feedback-based control scheme. The control scheme can be used to control the driving of a plurality of actuator members such as two, three, four, five, or more motors. One or more controllers, which may be situated on a carrier or on a movable object carrying the carrier, can generate control signals for driving the actuator members. In some instances, the control signals can be generated based on data received from carrier sensors indicative of the spatial disposition of the carrier or the payload carried by the carrier. The carrier sensors may be situated on the carrier or the payload, as previously described herein. The control signals produced by the controllers can be received by a first actuator driver, a second actuator driver, and/or a third actuator driver. Based on the control signals, the first, second, and/or third actuator drivers may control the driving of the first, second, and/or third actuator members, for example, to effect a rotation of one or more components of the carrier. An actuator driver can include hardware and/or software components suitable for controlling the driving of a corresponding actuator member and receiving position signals from a corresponding sensor (e.g., potentiometer). The control signals can be transmitted simultaneously to the actuator drivers to produce simultaneous driving of the actuator members. Alternatively, the control signals can be transmitted sequentially, or to only one of the actuator drivers. Advantageously, the control scheme can be used to provide feedback control for driving actuator members of a carrier, thereby enabling more precise and accurate rotation of the carrier components.

In some instances, the carrier can be coupled indirectly to the UAV via one or more damping elements. The damping elements can be configured to reduce or eliminate movement of the load (e.g., payload, carrier, or both) caused by the movement of the movable object (e.g., UAV). The damping elements can include any element suitable for damping motion of the coupled load, such as an active damping element, a passive damping element, or a hybrid damping element having both active and passive damping characteristics. The motion damped by the damping elements provided herein can include one or more of vibrations, oscillations, shaking, or impacts. Such motions may originate from motions of the movable object that are transmitted to the load, for example, via the fourth frame member 1428. For example, the motion may include vibrations caused by the operation of a propulsion system and/or other components of a UAV.

The damping elements may provide motion damping by isolating the load from the source of unwanted motion by dissipating or reducing the amount of motion transmitted to the load (e.g., vibration isolation). The damping elements may reduce the magnitude (e.g., amplitude) of the motion that would otherwise be experienced by the load, such as by greater than or equal to approximately 10%, 20%, 30%, 40%, 50%, 60%, 70%, 80%, 90%, or 100%. In some instances, the damping elements can be configured to reduce motions having certain frequencies. For example, some damping elements can reduce high frequency motions, while other damping elements can reduce low frequency motions. The damping elements can damp motions having frequencies greater than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz. Alternatively, the damping elements can damp motions having frequencies less than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz. The motion damping applied by the damping elements may be used to stabilize the load, thereby improving the quality of images captured by the load (e.g., image capturing device), as well as reducing the computational complexity of image stitching steps required to generate a panoramic image based on the captured images.

The damping elements described herein can be formed from any suitable material or combination of materials, including solid, liquid, or gaseous materials. The materials used for the damping elements may be compressible and/or deformable. For example, the damping elements can be made of sponge, foam, rubber, gel, and the like. For example, damping elements can include rubber balls that are substantially spherical in shape, such as illustrated in FIG. 12. The damping elements can be of any suitable shape such as substantially spherical, rectangular, cylindrical, and the like. Alternatively or in addition, the damping elements can include piezoelectric materials or shape memory materials. The damping elements can include one or more mechanical elements, such as springs, pistons, hydraulics, pneumatics, dashpots, shock absorbers, isolators, and the like. The properties of the damping elements can be selected so as to provide a predetermined amount of motion damping. For example, the damping elements may have a characteristic stiffness, which may correspond to a Young's modulus of the damping element. The Young's modulus may be greater than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. Alternatively, the Young's modulus may be less than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. In some instances, the damping elements may have viscoelastic properties. The properties of the damping elements may be isotropic or anisotropic. For instance, the damping elements may provide motion damping equally along all directions of motion. Conversely, the damping element may provide motion damping only along a subset of the directions of motion (e.g., along a single direction of motion). For example, the damping elements as illustrated in FIG. 12 may provide damping primarily along the Y (yaw) axis 1406. As such, the illustrated damping elements can be configured to reduce vertical motions.

Although embodiments herein may be depicted as utilizing a single type of damping elements (e.g., rubber balls), it shall be understood that any suitable combination of types of damping elements can be used. For example, the carrier may be coupled to the movable object using one, two, three, four, or more damping elements of any suitable type or types. The damping elements may have the same or different characteristics or properties such as stiffness, viscoelasticity, and the like. Each damping element can be coupled to a different portion of the load or only to a certain portion of the load. For instance, the damping elements may be located near contact or coupling points or surfaces of between the load and the movable objects (e.g., near the coupling members 1430 of the fourth frame member 1428). In some instances, the load can be embedded within or enclosed by one or more damping elements.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for providing flight information related to an unmanned aerial vehicle (UAV) coupled to a payload, said method comprising:
receiving, at a remote terminal, UAV state information comprising at least attitude information of the UAV when the UAV is airborne;
receiving, at the remote terminal, payload state information comprising at least attitude information of the payload relative to the UAV when the UAV is airborne;
receiving, at the remote terminal, an image captured by the payload;
determining, based on sensing data from one or more sensors of the remote terminal, remote terminal state information comprising at least orientation information of the remote terminal;
processing the received UAV state information and the remote terminal state information to determine a spatial relationship between the UAV and the remote terminal; and
simultaneously displaying, in a same display area on a display of the remote terminal, the UAV attitude information, the payload attitude information, the image, the remote terminal state information, and the determined spatial relationship between the UAV and the remote terminal, wherein displaying the remote terminal state information comprises displaying a graphical indicator that indicates a direction the remote terminal is facing.

2. The method of claim 1, wherein the UAV state information further comprises a distance of the UAV relative to a reference point.

3. The method of claim 2, wherein the reference point includes a location of the remote terminal or a home point for the UAV to return to.

4. The method of claim 2, wherein the reference point includes an object within a predetermined range from the UAV.

5. The method of claim 1, wherein the display comprises a primary display area and one or more distinct secondary display areas, said primary display area being larger than each of the one or more distinct secondary display areas, and wherein an area in which the UAV state information, the payload state information, or the image is displayed can be toggled between the primary display area and the one or more distinct secondary display areas.

6. The method of claim 5, wherein the primary display area or the one or more secondary display areas comprise an icon display region and a flight parameters display region.

7. The method of claim 1, wherein displaying the UAV state information and the payload state information comprises displaying one or more graphical indicators in the same display area.

8. The method of claim 7, wherein the one or more graphical indicators comprise an attitude indicator used to indicate the payload's attitude with respect to its yaw axis.

9. The method of claim 7, wherein the one or more graphical indicators comprise an attitude indicator used to indicate the payload's attitude with respect to its pitch axis.

10. The method of claim 7, wherein the one or more graphical indicators comprise a field of view (FOV) indicator used to indicate a field of view of the payload.

11. The method of claim 7, wherein the one or more graphical indicators comprise an attitude indicator used to indicate the payload's attitude with respect to its roll axis.

12. The method of claim 7, wherein the one or more graphical indicators comprise a UAV attitude indicator used to indicate a pitch, a yaw, and/or a roll of the UAV.

13. The method of claim 1, wherein the remote terminal state information further comprises a position of the remote terminal.

14. The method of claim 1, further comprising receiving one or more user-defined parameters via a user interface from a user to customize the display.

15. The method of claim 1, wherein the displaying is effected in response to a user selection via a user interface.

16. The method of claim 15, wherein the user interface includes an icon representing the UAV and a three-dimensional (3D) depiction of the UAV's spatial orientation relative to the remote terminal.

17. The method of claim 1, further comprising displaying a map that indicates a position of the UAV and/or a position of the remote terminal.

18. The method of claim 17, wherein the map overlaps with the image.

19. The method of claim 18, wherein the map shows a spatial relationship between the UAV and one or more reference points.

20. The method of claim 17, wherein the map shows a field of view (FOV) of the payload or a flight path of the UAV.

21. The method of claim 17, wherein the UAV is coupled to the payload via a carrier that permits the payload to move relative to the UAV.

22. The method of claim 1, further comprising simultaneously displaying one or more control sections on the display, wherein the one or more control sections allow a user to control the UAV, the payload, and/or a carrier that couples the payload to the UAV while the UAV is airborne.

23. The method of claim 22, wherein the one or more control sections allow the user to toggle between a follow mode and a lock mode for the UAV, wherein the follow mode allows the UAV to follow the user or the remote terminal, and wherein the lock mode allow the UAV to fly according to a preset direction or predetermined flight path.

24. The method of claim 22, wherein the one or more control sections comprise a control for activating or deactivating an autonomous routine of the UAV.

25. The method of claim 1, further comprising displaying a data storage capacity of the payload and/or the UAV.

26. The method of claim 1, wherein the direction that the remote terminal is facing is determined based on measurement from a magnetometer and/or GPS sensor associated with the remote terminal.

27. A system for providing flight information related to an unmanned aerial vehicle (UAV) coupled to a payload, said system comprising:
one or more receivers configured to receive UAV state information comprising at least attitude information of the UAV, payload state information comprising at least attitude information of the payload when the UAV is airborne, and an image captured by the payload when the UAV is airborne;
one or more processors configured to:
determine, based on sensing data from one or more sensors of a remote terminal, remote terminal state information comprising at least orientation information of the remote terminal;
process the received UAV state information and the remote terminal state information to determine a spatial relationship between the UAV and the remote terminal; and
effect simultaneous display of the UAV state information, in a same display area on a display of the remote terminal, the payload state information, the image, the remote terminal state information, and the determined spatial relationship between the UAV and the remote terminal, wherein displaying the remote terminal state information comprises displaying a graphical indicator that indicates a direction the remote terminal is facing.

28. The system of claim 27, wherein the one or more processors are further configured to display a map that indicates a position of the UAV and/or a position of the remote terminal.

29. One or more non-transitory computer-readable storage media storing computer-executable instructions that, when executed by a computing system, configure the computing system to perform operations comprising:
receiving, at a remote terminal, UAV state information comprising at least attitude information of an unmanned aerial vehicle (UAV) when the UAV is airborne;
receiving, at the remote terminal, payload state information comprising at least attitude information of a payload relative to the UAV when the UAV is airborne;
receiving, at the remote terminal, an image captured by the payload;
determining, based on sensing data from one or more sensors of the remote terminal, remote terminal state information comprising at least orientation information of the remote terminal;
processing the received UAV state information and the remote terminal state information to determine a spatial relationship between the UAV and the remote terminal; and
simultaneously displaying, in a same display area on a display of the remote terminal, the UAV attitude information, the payload attitude information, the image, the remote terminal state information, and the determined spatial relationship between the UAV and the remote terminal, wherein displaying the remote terminal state information comprises displaying a graphical indicator that indicates a direction the remote terminal is facing.

30. A remote terminal for controlling an unmanned aerial vehicle (UAV), comprising:
a display;
one or more sensors configured to provide sensing data;
one or more receivers configured to receive UAV state information comprising at least attitude information of the UAV, payload state information comprising at least attitude information of a payload coupled to the UAV, and an image captured by the payload when the UAV is airborne; and
one or more processors configured to:
determine, based on the sensing data from the one or more sensors, remote terminal state information comprising at least orientation information of the remote terminal;
process the received UAV state information and the remote terminal state information to determine a spatial relationship between the UAV and the remote terminal; and
effect simultaneous display of the UAV state information, in a same display area on the display, the payload state information, the image, the remote terminal state information, and the determined spatial relationship between the UAV and the remote terminal, wherein displaying the remote terminal state information comprises displaying a graphical indicator that indicates a direction the remote terminal is facing.

\* \* \* \* \*